United States Patent
Huang et al.

(10) Patent No.: US 9,717,011 B2
(45) Date of Patent: Jul. 25, 2017

(54) EVENT MANAGEMENT IN TELECOMMUNICATIONS NETWORKS

(71) Applicant: Telefonaktiebolaget L M Ericsson (publ), Stockholm (SE)

(72) Inventors: Yangcheng Huang, Athlone (IE); Jan Groenendijk, Athlone (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/435,313

(22) PCT Filed: Oct. 17, 2012

(86) PCT No.: PCT/EP2012/070582
§ 371 (c)(1),
(2) Date: Apr. 13, 2015

(87) PCT Pub. No.: WO2014/060033
PCT Pub. Date: Apr. 24, 2014

(65) Prior Publication Data
US 2015/0296399 A1     Oct. 15, 2015

(51) Int. Cl.
G01R 31/08     (2006.01)
H04W 24/10    (2009.01)
H04L 12/24     (2006.01)

(52) U.S. Cl.
CPC ........... H04W 24/10 (2013.01); H04L 41/069 (2013.01)

(58) Field of Classification Search
USPC ....................................................... 370/241
See application file for complete search history.

(56) References Cited

U.S. PATENT DOCUMENTS

| 7,739,445 B1 * | 6/2010 | Venkatachary | G11C 15/00 365/49.17 |
| 2003/0154402 A1 | 8/2003 | Pandit et al. | |

(Continued)

FOREIGN PATENT DOCUMENTS

| CN | 1947403 A | 4/2007 |
| CN | 103081403 A | 5/2013 |

OTHER PUBLICATIONS

Enterprise Integration Patterns, "Messaging Router", Messaging Patterns, http://www.enterpriseintegrationpatterns.com/patterns/messaging/MessageRouter.html[Feb. 9, 2015 16:31:25] 2003, 2005 Gregor Hohpe, Bobby Woolf.

(Continued)

*Primary Examiner* — Phuongchau Ba Nguyen
(74) *Attorney, Agent, or Firm* — Coats & Bennett, PLLC

(57) ABSTRACT

In a telecommunications network, information about events that occur at nodes (27) is sent to event-based management applications (31) in operations and maintenance servers (21). Event reports (23) comprising such event information are replaced or accompanied in data packets by event summaries (33). The summaries (33) can be used to route the data packets to the correct event-based management application (31) with less processing time and resources than if the event reports (23) are used for routeing, because information about the events can be obtained from the summaries (33) more easily than from the event reports (23). Routeing using the summaries (33) may be done in a fast path. Some event-based management applications can use the summaries (33) instead of the event reports (23), which can also save processing time and resources, and such event-based management applications may be performed in a fast path.

13 Claims, 17 Drawing Sheets

(56) References Cited

U.S. PATENT DOCUMENTS

| | | |
|---|---|---|
| 2008/0162592 A1* | 7/2008 | Huang ................ G06F 11/3476 |
| 2008/0270628 A1 | 10/2008 | Nekovee et al. |
| 2011/0289102 A1 | 11/2011 | Pearson et al. |
| 2012/0113824 A1 | 5/2012 | Olsson |
| 2013/0179568 A1 | 7/2013 | Huang |

OTHER PUBLICATIONS

Wikipedia, the Free Encyclopedia, "MurmurHash", Feb. 9, 2015, pp. 1-3, https://en.wikipedia.org/w/index.php?title=MurmurHash&oldid=515968927.

3rd Generation Partnership Project, "Technical Specification Group Radio Access Network; Evolved Universal Terrestrial Radio Access Network (E-UTRAN); Architecture description (Release 11)", 3GPP TS 36.401 V11.0.0, Sep. 2012, pp. 1-20.

3rd Generation Partnership Project, "Technical Specification Group Services and System Aspects; General Packet Radio Service (GPRS) enhancements for Evolved Universal Terrestrial Radio Access Network (E-UTRAN) access (Release 11)", 3GPP TS 23.401 V11.3.0, Sep. 2012, pp. 1-283.

3rd Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)", 3GPP TS 29274 V11.4.0, Sep. 2012, pp. 1-219.

\* cited by examiner

EVENT MANAGEMENT IN TELECOMMUNICATIONS NETWORKS

TECHNICAL FIELD

The present invention relates to devices and methods for handling event reports in telecommunications networks, such as the network of a cellular mobile telephone operator. The invention also relates to computer programs for implementing such methods (or computer program updates or plug-ins for modifying a computer program so as to implement such a method), and data carriers storing such programs (or plug-ins).

BACKGROUND

A telecommunications network is a computerised network in which information can be communicated between interconnected nodes, at which the data can be processed and/or forwarded. Typically, the data is transmitted in packets, which have a predefined data structure including header information that identifies the source and intended destination of the data packet and a payload that contains data being carried in the packet. Typically, a telecommunications network may be used to convey data sent by one end user to another end user. The data may be telephone voice data, image data or other data generated by the end user, such as a computer data file that a user wishes to send to another user. Additionally, a telecommunications network may be used to send or receive data via the Internet, such as emails and web pages.

Such telecommunications networks can be very large and complex, and the operator of a large-scale network will normally need to monitor the state and behaviour of the network in order to ensure that it continues to function properly, and some of this monitoring needs to be done in real time. For example, the network operator needs to monitor which nodes are able to communicate with which other nodes, in order to be able to detect and respond to problems that may arise at an individual node or in the communication link between them. The operator will also wish to monitor the operations of individual nodes to ensure that they are performing properly. The operator will need to monitor the beginnings and ends of communication sessions (such as telephone calls and data sessions) involving end users and also any significant performance events during a session, such as handover of a mobile telephone call from one base station to another owing to movement of the mobile telephone. In addition to real time monitoring, the network operator will typically also need to store information about the performance of the network for subsequent analysis and as a record of performance.

One way of carrying out these monitoring activities involves event recording. In such an arrangement, a node in the network will record information about many of the actions it takes and things that happen to it, and will prepare and send reports to an operations and maintenance system in the network. These reports, herein referred to as "event reports", contain data values of items of information relating to an event that has occurred at the node. A single event will typically include both something that happens to the node as a result of an action outside the node, such as the reception of a signal by the node, and actions that are performed by the node (e.g. in response to the reception of a signal). For example, when a user begins a mobile phone call the mobile phone will send an initial request to a nearby base station, which will forward the request to a local serving gateway. In addition to handling the request, the serving gateway may record details such as the time the request was received, the time it responded to the request, details identifying the mobile phone making the request, information about the request such as the network that the mobile phone requested access to, the actions that the serving gateway took to handle the request (e.g. by sending a signal to an appropriate packet data gateway) and the responses that it received to those actions, and the outcome of the request. This information is then formatted into an event report, which is transmitted through the telecommunications network to the operations and maintenance system, allowing network management functions to monitor such matters as how busy parts of the network are, what proportion of requests from user equipment (mobile phones etc), to make calls or establish other connections, are unsuccessful, and which networks users are trying to connect to. Other types of nodes, in other parts of the network, will provide reports with different information, reflecting the different types of events that happen at those nodes.

The total number of event reports generated in a telecommunications network may be very large. For example, a single network management server or operations and maintenance server may receive thousands or even tens of thousands of simultaneous streams of event reports, and during busy periods the network may be providing more than a million event reports per second. Furthermore, in a large telecommunications network it is typical that different nodes may be implemented with different software versions or software from different suppliers, and additionally different types of nodes will be reporting on different types of events. Accordingly, the contents and formats of event reports can vary. Additionally, different nodes may encode event reports differently from one another when preparing the report data for insertion into a data packet for transmission.

In the network management system, different event-based management applications will need different event data in order to perform respective different operations. Since different event-based monitoring applications may need to receive reports of different types of events from the same source (i.e. the same network node), it may not be adequate to route event reports solely on the basis of which node they originate from. Therefore any event routeing system may be need to refer to the contents of the event reports to enable it to deliver each report to the relevant management application or applications. However, the variation in encoding formats means that the routeing operations will have to include relatively complex operations to unpack and decode event reports in order to access the content of an event report. Consequently, correct routeing and handling of event reports consumes a substantial amount of server resources.

SUMMARY OF THE INVENTION

According to an aspect of the present invention there is provided a method of processing event information in a node of a telecommunications network, comprising logging information about an event at the node as it occurs, processing the logged information about the event in a predetermined manner to produce a summary, preferably in the form of a bit stream, that summarises at least some of the logged information about the event and can be interrogated to provide information about the event, and transmitting the summary over the network. Normally, the logged event information is also formed into an event report, and the summary is transmitted with the event report. However, in some circumstances the summary may be transmitted without an event report. Preferably, the summary is transmitted as a sequence of bits that is searchable without decoding, whereas the event report may be encoded before transmission. The event report and/or summary may be usable in a network monitoring application running on a computerised system at another location in the network. If the summary is transmitted in a data packet, the packet may be addressed to the network monitoring application or to an event information router.

As an alternative, an event report may be used as the source of the event information that is processed to produce the summary, and this may be done at the node that creates the event report or at another, downstream, node.

The summary may be prepared by assembling the event information into predetermined data units, and applying each data unit to one or more predetermined hash functions. The outputs of the hash functions may be assembled, for example, into a Bloom filter to provide the summary. Preferably, each data unit comprises a data value for one item of event information and an ID code identifying what the value represents. The items of information relating to an event are sometimes known as the attributes of the event. Preferably, for all events that generate data representing the same set of attributes, each attribute is given a predetermined unique identification number and this is used as the ID for the value of that attribute (i.e. the data value for that item of information). If an event report is also created, the report may list the data values in the order of their corresponding identification numbers, and the identification numbers can be simply the sequence numbers of the values in the event report. However, if desired, a different way of defining IDs for the values may be used. For example, if the node logs information for a plurality of different types of event, and there is one or more attribute for which a value is recorded during more than one type of event (e.g. reports for several different types of event may all include the value of the IMSI (that identifies the user) and the IMEI (that identifies the user's equipment)), the IDs may be chosen so that the same attribute is identified by the same ID in preparing summaries for events of more than one (and preferably all) types of event for which a value for that property is recorded.

If the summary is transmitted in a data packet, it may be placed either in the payload of the packet or in the packet header. For example, if it is transmitted over a packet switched network, the summary may be placed in the packet header of the transport layer.

It is possible for an event report to include data values for items of information relating to more than one event, although normally each report will relate to one event. It is possible to combine multiple event reports into a single block for transmission as packet data (transmitted in one or more packets depending on the data size of the block), and a single summary may be created for the block. Consequently, a summary may relate to more than one event and more than one event report. In this case, a data unit as discussed above may comprise a data value for an item of event information, an ID code to identify what the value represents, and an ID code to identify which event it relates to.

According to an aspect of the invention there is provided a method of processing event information in a node of a telecommunications network, wherein the event information comprises a set of data values for respective items of information about one or more events that have occurred in the telecommunications network, the method comprising: (a) performing one or more predetermined operations on the event information to produce a summary that can be interrogated to obtain meta-information, the meta-information being information about the data value of at least one (usually at least two, but not necessarily all) of the items of information in the event information, and the summary having a smaller data size than the total data size of all of the data values about which said meta-information can be obtained from the summary; (b) creating a data packet that contains the summary; and (c) transmitting the data packet over the telecommunications network.

This method may be carried out at the node where the event occurs. In this case, the method further comprises: (d) recording information about an event as it occurs, step (d) being performed before step (a).

According to another aspect of the invention there is provided a node for use in a telecommunications network, the node comprising a processor, a memory and a network interface, and the node being arranged to respond to the occurrence at the node of an event of at least one predetermined type by: recording data values in respect of a plurality of items of information about the event so as to generate event information comprising a set of data values for respective items of information about one or more events that have occurred at the node performing one or more predetermined operations on the event information to produce a summary that is can be interrogated to obtain meta-information, the meta-information being information about the data value of at least one (usually at least two, but not necessarily all) of the items of information in the event information, the summary having a smaller data size than the total data size of all of the data values about which said meta-information can be obtained from the summary; creating a data packet that contains the summary; and transmitting the data packet over the telecommunications network.

In addition to transmitting the summary, the node may also transmit information about the event in an event report, and the event report may be part of a block of event reports. The method, or the operations carried out at the node, may comprise (e) forming at least one event report, each said event report comprising at least the said set of data values for at least one respective event that has occurred at the said node; and (f) encoding an event report, or a block comprising a plurality of event reports, for transmission in a data packet.

Preferably the summary is formed from the relevant items of information about the event before or in parallel with the formation of any event report. However, circumstances may arise in which an event report is formed, and subsequently it is analysed to obtain event information that is then used to produce the summary. This approach allows the summary to be produced using a separate computer program or application from the one that initially forms the event report, which may make node design easier to manage. The method, or the operations carried out at the node, may comprise (g) decoding the encoded event report or the block of event reports and analysing the decoded event report or block of event reports to obtain the event information, steps (e), (f) and (g) being carried out before step (a).

Alternatively, the node where the event takes place may form an event report and transmit it without producing the summary, and a separate downstream node may carry out the task of producing the summary, using the event information in the event report. The method may comprise (h) receiving a data packet at the node, the data packet containing an event report, or a block comprising a plurality of event reports, in encoded form, recovering the encoded event report or block of event reports from the data packet, and decoding the event report or block of event reports, the event report or each of the plurality of event reports comprising at least the said set of data values for a respective event that occurred at the different node; and (i) analysing the decoded event report or block of event reports to obtain the event information; steps (h) and (i) being carried out before step (a).

According to a further aspect of the invention there is provided a node for use in a telecommunications network, the node comprising a processor, a memory and a network interface, and the node being arranged to respond to the reception at the node of a data packet containing an event report in encoded form, or containing a block comprising a plurality of event reports in encoded form, the event report or each of the plurality of event reports comprising at least a set of data values for respective items of information about a respective event that occurred at a different node in the telecommunications network, by: recovering the encoded event report or encoded block of event reports from the data packet; decoding the event report or block of event reports, analysing the decoded event report or block of event reports to obtain event information comprising said set of data values for at least one event; performing one or more predetermined operations on the event information to produce a summary that can be interrogated to obtain meta-information, the meta-information being information about the data value of at least one (usually at least two, but not necessarily all) of the items of information in the event information, the summary having a smaller data size than the total data size of all of the data values about which said meta-information can be obtained from the summary; creating a data packet that contains the summary; and transmitting the created data packet over the telecommunications network.

Normally the event report and the corresponding summary will be sent in the same data packet. Normally, if a block of event reports is sent in a data packet, the summary will cover all the event reports in the block.

The summary can have any form, and be created by any process, provided that meta-information about an event can be obtained from it. For example, the summary may be a binary sequence, string or array. The term "binary sequence" in this context covers any succession of binary values ("1"s and "0"s). Preferably the summary is a binary sequence that can be interrogated, without decoding, to obtain the said meta-information, and the said data packet contains the binary sequence in unencoded form.

In another aspect, the invention provides a method of processing event information in a node of a telecommunications network, wherein the event information comprises a set of data values for respective items of information about one or more events that have occurred in the telecommunications network, the method comprising: (a) performing one or more predetermined operations on the event information to produce a binary sequence that can be interrogated, without decoding, to obtain meta-information, the meta-information being information about the data value of at least one (usually at least two, but not necessarily all) of the items of information in the event information; (b) creating a data packet that contains the binary sequence in unencoded form; and (c) transmitting the data packet over the telecommunications network.

In yet another aspect, the invention provides a node for use in a telecommunications network, the node comprising a processor, a memory and a network interface, and the node being arranged to respond to the occurrence at the node of an event of at least one predetermined type by: recording data values in respect of a plurality of items of information about the event so as to generate event information comprising a set of data values for respective items of information about one or more events that have occurred at the node performing one or more predetermined operations on the event information to produce a binary sequence that can be interrogated, without decoding, to obtain meta-information, the meta-information being information about the data value of at least one (usually at least two, but not necessarily all) of the items of information in the event information; creating a data packet that contains the binary sequence in unencoded form; and transmitting the data packet over the telecommunications network.

In a further aspect, the invention provides a node for use in a telecommunications network, the node comprising a processor, a memory and a network interface, and the node being arranged to respond to the reception at the node of a data packet containing an event report in encoded form, or containing a block comprising a plurality of event reports in encoded form, the event report or each of the plurality of event reports comprising at least a set of data values for respective items of information about a respective event that occurred at a different node in the telecommunications network, by: recovering the encoded event report or encoded block of event reports from the data packet; decoding the event report or block of event reports, analysing the decoded event report or block of event reports to obtain event information comprising said set of data values for at least one event; performing one or more predetermined operations on the event information to produce a binary sequence that can be interrogated, without decoding, to obtain meta-information, the meta-information being information about the data value of at least one (usually at least two, but not necessarily all) of the items of information in the event information; creating a data packet that contains the binary sequence in unencoded form; and transmitting the created data packet over the telecommunications network.

In another aspect of the present invention there is provided a method of routeing data packets in a telecommunications network comprising: (i) receiving a plurality of data packets and, in respect of at least some data packets of the plurality of the data packets, extracting a summary of event information that can be interrogated to provide meta-information about the event information, (ii) using data defining a desired summary content, or data defining a set of desired summary contents linked by logical rules, representing predefined criteria, to interrogate the summary and determining from the interrogation result whether the predetermined criteria are met, and (iii), in the case that the criteria are met, performing at least one of (a) sending the data packet to a predetermined destination; (b) sending the summary to a predetermined destination; and (c) processing the data packet to retrieve one or more event reports and sending the event report or at least one of the event reports to a predetermined destination.

The data defining a desired summary content, or a set of desired summary contents, may generated from one or more criteria, relating to an application running in the network, for selecting events on the basis of the data value of one or more items of information about the event. The data defining a desired summary content, or a set of desired summary contents, may be generated as required or may be stored in a memory.

The predetermined criteria are used to select which packets are relevant to the predetermined destination, and this method enables the relevant packets to be identified without needing to decode and analyse an event report in the packet. This reduces the amount of network resources that are needed to route event information. The operations, required to interrogate the summary and determine whether the criteria are met, may be highly predictable and substantially the same for each summary. In this case, it may be possible to design a special fast processing path, using special software, special hardware, or a combination of both, for deciding whether and where to send the data packet, the summary or the event report(s). This is likely to reduce the load on the main processor at the node performing the method, since it reduces the need to decode and analyse event reports, which typically needs to be done in the slow processing path using the main processor.

Preferably, the data defining a desired summary content comprises a search mask having the same size as the summary, and indicating, in respect of one or more data locations within the summary, the data value required by the desired summary content. If the data defines a plurality of desired summary contents, preferably the data comprises such a mask in respect of each desired summary content. Accordingly, interrogating the summary can be performed simply by looking for matches of the summary with a search mask at the appropriate locations. If the summary and the search mask can each be represented as binary numbers of the same length, the process of looking for matches can be performed by a bitwise AND operation. However, since a typical search mask only requires a particular data item to be present at a relatively small number of the total data locations within the summary, and the data value present at the remaining locations is irrelevant, the search result data may be stored as a list of the data locations in the summary that need to be searched, and optionally the data value that is required to be present at the data location. It is not always necessary to store the data value that is required to be present, if the search results are defined so that it is always the same data value that is required. In this way, data corresponding to the search mask can be stored in less space. If a search mask is required, having the same length as the summary, this can easily be reconstructed from the stored list of data locations (and data values if they are also stored).

The summary may be interrogated in respect of multiple desired summary contents, or multiple sets of desired summary contents, each defining different respective criteria corresponding to different destinations to which the packet, summary or event report is sent if the criteria are met. If the criteria are not met for any destination, the packet may be discarded or alternatively it may be forwarded to a further predetermined destination or in accordance with destination address information contained in the packet.

The method may comprise reading source address information from the packet header and retrieving or generating a selected one of a plurality of desired summary contents or sets of desired summary contents in respect of a criterion or a set of criteria, depending on the source address. This allows the system to adapt its interrogation of the summary according to the node it comes from, and in this way the system can cope with differences in the size, format or arrangement of contents in summaries from different nodes.

A criterion may correspond to the presence of a particular value for a particular item of information (attribute) relating to an event, or respective particular values for a plurality of particular items of information relating to an event. The step of generating data corresponding to a particular desired summary content may comprise processing the data value and an identification code for the data value (identifying the item of information that it relates to), or processing the respective data value and its respective identification code for each of the plurality of particular items of information required by the criterion, with one or more predetermined hash functions. If this is done using the same identification codes for the same items of information and using the same hash functions in the same manner as were used for generating the summary, the interrogation result will indicate that the desired summary content is present if the summary contains the same hash values in the same locations as the hash data defining the desired summary content. Because hash functions can provide false positives (i.e. two different inputs can provide the same output, so the presence of an output does not guarantee the presence of a particular input), a packet, summary or event report may be sent to a destination when the criteria have not in fact been met. The use of multiple hash functions reduces the likelihood that this will occur. Hash functions do not provide false negatives, and therefore it is anticipated that this method will not fail to send a packet, summary or event report to a destination when the criteria are met.

Normally, the criteria specify that a particular network management application requires the event report or event summary as input data for the network management operation that it carries out. The present method may be carried out in a network node at which such a network management application is running, in which case the packet, summary or event report may be sent directly to the network management application if the search result indicates that its criteria are met. Alternatively, the criteria may relate to a network management application that is running at a different node of the network, in which case the packet, summary or event report is sent over the network. In this case, it is normally the packet that is sent.

According to an aspect of the invention there is provided a method of routeing event data at a first node in a telecommunications network, the method comprising: (i) receiving a data packet including event data, the event data comprising at least a summary that can be interrogated to obtain meta-information, the meta-information being information about the data value of at least one item of information (usually at least two items of information) about one or more events that have occurred at a second node in the telecommunications network, the summary having a smaller data size than the total data size of all of the data values about which said meta-information can be obtained from the summary; (ii) interrogating the summary in accordance with each of one or more sets of requirements relating to an application running in the network, each set of requirements defining meta-information, obtainable from the summary, corresponding to one or more criteria for selecting events on the basis of the data value of one or more items of information about the event; (iii) determining in accordance with the results of step (ii) whether the data packet includes event data that is required by the application; and (iv) if it is determined in step (iii) that the data packet includes event data that is required by the application, performing at least one of (a) copying or forwarding the data packet to the application, (b) sending the summary to the application, (c) extracting an event report or block of event reports contained in the data packet, the event report or each of the event reports comprising a set of data values for respective items of information about an event that has occurred at the second node in the telecommunications network, and sending at least one event report to the application.

According to another aspect of the present invention there is provided a node for use in a telecommunications network, the node comprising a processor, a memory and a network interface, and the node being arranged to respond to the reception at the node of a data packet including event data, the event data comprising at least a summary that can be interrogated to obtain meta-information, the meta-information being information about the data value of at least one item of information (usually at least two items of information) about one or more events that have occurred at another node in the telecommunications network, and the summary having a smaller data size than the total data size of all of the data values about which said meta-information can be obtained from the summary, by: interrogating the summary in accordance with each of one or more sets of requirements relating to an application running in the network, each set of requirements defining meta-information, obtainable from the summary, corresponding to one or more criteria for selecting events on the basis of the data value of one or more items of information about the event; determining in accordance with the results of the said interrogating whether the data packet includes event data that is required by the application; and if it is determined that the data packet includes event data that is required by the application, performing at least one of (a) copying or forwarding the data packet to the application, (b) sending the summary to the application, (c) extracting an event report or block of event reports contained in the data packet, the event report or each of the event reports comprising a set of data values for respective items of information about an event that has occurred at the said other node in the telecommunications network, and sending at least one event report to the application.

The application to which the criteria relate may be running at the same node. In this case, the normally either the summary is sent to the application (if the application can make use of it) or the event report (or block of event reports) is decoded and one or more event reports is sent to the application (if the application needs the receive event reports). In other cases, the application to which the criteria relate may be running at a different node. In this case, the data packet is normally copied or forwarded to the application.

Preferably the summary is a binary sequence that can be interrogated, without decoding, to obtain the said meta-information, each set of requirements defines said meta-information by specifying, in respect of one or more locations in the binary sequence, a required value for that location in the binary sequence, and the said step of interrogating comprises interrogating the binary sequence in accordance with each of the one or more sets of requirements to determine, for each respective set of requirements, whether the required values are present at each of the one or more locations in the binary sequence.

In another aspect, the invention provides a method of routeing event data at a first node in a telecommunications network, the method comprising: (i) receiving a data packet including event data, the event data comprising at least a binary sequence that can be interrogated, without decoding, to obtain meta-information, the meta-information being information about the data value of at least one item of information (usually at least two items of information) about one or more events that have occurred at a second node in the telecommunications network; (ii) interrogating the binary sequence in accordance with each of one or more sets of requirements relating to an application running in the network, each set of requirements defining meta-information, obtainable from the binary sequence, corresponding to one or more criteria for selecting events on the basis of the data value of one or more items of information about the event, each set of requirements defining said meta-information by specifying, in respect of one or more locations in the binary sequence, a required value for that location in the binary sequence, said interrogating being to determine, for each respective set of requirements, whether the required values are present at each of the one or more locations in the binary sequence; (iii) determining in accordance with the results of step (ii) whether the data packet includes event data that is required by the application; and (iv) if it is determined in step (iii) that the data packet includes event data that is required by the application, performing at least one of (a) copying or forwarding the data packet to the application, (b) sending the binary sequence to the application, (c) extracting an event report or block of event reports contained in the data packet, the event report or each of the event reports comprising a set of data values for respective items of information about an event that has occurred at the second node in the telecommunications network, and sending at least one event report to the application.

In a further aspect, the present invention provides a node for use in a telecommunications network, the node comprising a processor, a memory and a network interface, and the node being arranged to respond to the reception at the node of a data packet including event data, the event data comprising at least a binary sequence that can be interrogated, without decoding, to obtain meta-information, the meta-information being information about the data value of at least one item of information (usually at least two items of information) about one or more events that have occurred at another node in the telecommunications network, by; interrogating the binary sequence in accordance with each of one or more sets of requirements relating to an application running in the network, each set of requirements defining meta-information, obtainable from the binary sequence, corresponding to one or more criteria for selecting events on the basis of the data value of one or more items of information about the event, each set of requirements defining said meta-information by specifying, in respect of one or more locations in the binary sequence, a required value for that location in the binary sequence, said interrogating being to determine, for each respective set of requirements, whether the required values are present at each of the one or more locations in the binary sequence; determining in accordance with the results of the said interrogating whether the data packet includes event data that is required by the application; and if it is determined that the data packet includes event data that is required by the application, performing at least one of (a) copying or forwarding the data packet to the application, (b) sending the binary sequence to the application, (c) extracting an event report or block of event reports contained in the data packet, the event report or each of the event reports comprising a set of data values for respective items of information about an event that has occurred at the said other node in the telecommunications network, and sending at least one event report to the application.

The step of interrogating the binary sequence may comprise using the binary sequence to address a content-addressable memory (preferably a ternary content-addressable memory) in which the one or more sets of requirements are stored (preferably as respective binary or ternary ("0", "1" or "don't care") sequences, which should normally have the same length as the binary sequence of the summary).

There may be multiple event-based management applications running in the network (possible not all at the same node) that need to receive information about the same event. A data packet containing the summary, and possibly the corresponding event report, may be addressed to a forwarding or routeing node, or it may be addressed to an application. A forwarding/routeing node to which a packet is addressed, or which "sniffs" a packet passing through it, may use the summary and the criteria relating multiple applications and thereby identify that the packet contains data relating to an event that is of interest to more than one application. In this case, multiple copies of the data packet are needed, so that one can be sent to each application that needs it, and so the node copies the packet. Similarly, when a packet, containing event information, arrives at a node where a particular management application is running, the node may use the criteria relating to multiple applications to identify that, in addition to the particular management application, there are other applications, possibly running at different nodes, that also need data from the same packet. This can also lead to the packet being copied.

In an alternative method, if the criteria are satisfied a counter is updated, instead of (or as well as) sending the data packet, the summary or an event report to the predetermined destination. In this case, the summary is being used to perform an event-based management operation rather than to perform data routeing. This provides a way to update key performance indicators for the network, such as the number of handover failures, without the need to decode and analyse an event report. This can significantly reduce the processing time taken, and hence the processing load on the relevant server, to maintain the key performance indicator concerned.

According to another aspect of the invention there is provided a method of processing event data at a node in a telecommunications network, comprising: sending to an application running at the node a summary that can be interrogated to obtain meta-information, the meta-information being information about the data value of at least one (usually at least two, but not necessarily all) items of information about one or more events that have occurred at a second node in the telecommunications network, the summary having a smaller data size than the total data size of all of the data values about which said meta-information can be obtained from the summary; the application interrogating the summary and determining whether one or more predetermined interrogation results are obtained; and if each of the one or more predetermined interrogation results are obtained, the application updating a counter.

According to yet another aspect of the present invention there is provided a node for use in a telecommunications network, the node comprising a processor, a memory and a network interface, and the node being arranged to respond to the reception at the node of a data packet including event data, the event data comprising at least a summary that can be interrogated to obtain meta-information, the meta-information being information about the data value of at least one item of information (usually at least two items of information) about one or more events that have occurred at another node in the telecommunications network, the summary having a smaller data size than the total data size of all of the data values about which said meta-information can be obtained from the summary, by interrogating the summary and determining whether one or more predetermined interrogation results are obtained; and if each of the one or more predetermined interrogation results are obtained, updating a counter.

Preferably the summary is a binary sequence that can be interrogated, without decoding, to obtain the said meta-information, the interrogating comprises interrogating the binary sequence to determine whether, for each of one or more predetermined locations in the binary sequence, the value at that location matches a predetermined value for that location, and each of the one or more predetermined interrogation results are obtained if each of the one or more predetermined locations has its respective predetermined value for that location.

In another aspect, the invention provides a method of processing event data at a node in a telecommunications network, comprising: sending to an application running at the node a binary sequence that can be interrogated, without decoding, to obtain meta-information, the meta-information being information about the data value of at least one (usually at least two, but not necessarily all) items of information about one or more events that have occurred at a second node in the telecommunications network; the application interrogating the binary sequence to determine whether, for each of one or more predetermined locations in the binary sequence, the value at that location matches a predetermined value for that location; and if each of the one or more locations has its respective predetermined value for that location, the application updating a counter.

In a further aspect, the invention provides a node for use in a telecommunications network, the node comprising a processor, a memory and a network interface, and the node being arranged to respond to the reception at the node of a data packet including event data, the event data comprising at least a binary sequence that can be interrogated, without decoding, to obtain meta-information, the meta-information being information about the data value of at least one item of information (usually at least two items of information) about one or more events that have occurred at another node in the telecommunications network, by interrogating the binary sequence to determine whether, for each of one or more predetermined locations in the binary sequence, the value at that location matches a predetermined value for that location; and if each of the one or more locations has its respective predetermined value for that location, updating a counter.

Further aspects of the present invention provide computer programs, and computer program products, for carrying out any of the methods mentioned above. Additionally, aspects of the invention provide computer program updates or plug-ins for modifying a computer program that does not carry out a method as mentioned above for creating a summary, so that the program as modified does carry out such a method. Such computer program updates or plug-ins may provide a convenient way to modify an existing program that creates event reports, so as to generate summaries instead of or as well as the event reports. A computer program plug-in is a routine that co-operates with a program to modify it so as to add new functionality to the program and/or alter an existing functionality. In general, the computer program with which the plug-in co-operates will function without the plug-in, but the plug-in will not function without the program (or another suitable program).

Further aspects of the invention and optional features are set out in the accompanying claims.

In an embodiment of the present invention, information about events that occur at nodes in a telecommunications network is sent to event-based management applications in operations and maintenance servers. Event reports comprising such event information are replaced or accompanied in data packets by event summaries. The summaries can be used to route the data packets to the correct event-based management application with less processing time and resources than if the event reports are used for routeing, because information about the events can be obtained from the summaries more easily than from the event reports. It may be possible for routeing using the summaries to be done in a fast path. Some event-based management applications may use the summaries instead of the event reports, which can also save processing time and resources, and it may be possible for such event-based management applications to be performed in a fast path.

BRIEF DESCRIPTION OF THE DRAWINGS

Embodiments of the present invention, given by way of non-limiting example, will now be described with reference to the drawings.

DETAILED DESCRIPTION OF THE EMBODIMENTS

Figure 1:
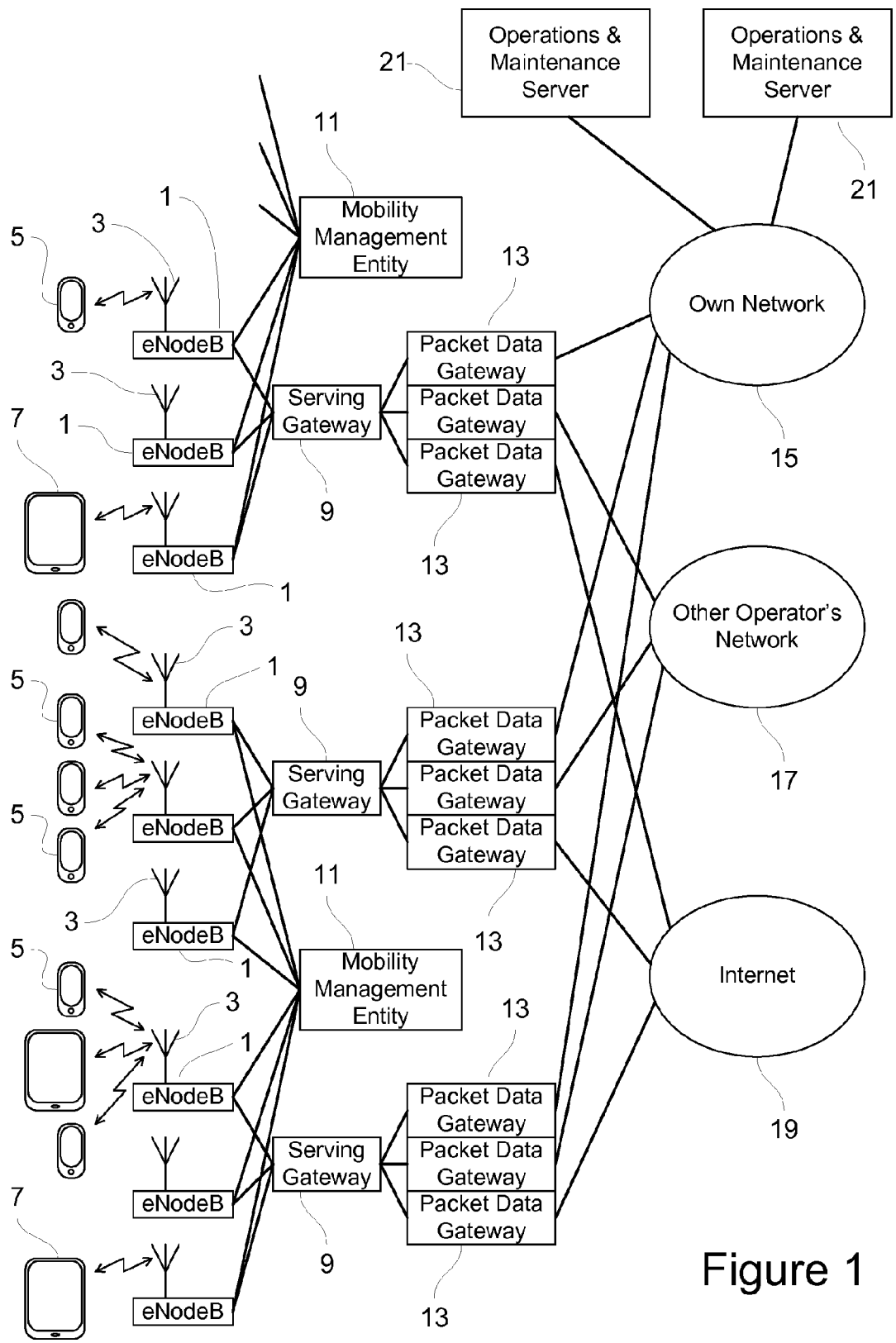
FIG. 1 is a simplified schematic diagram of part of a telecommunications network.

FIG. 1 is a simplified schematic diagram of part of a telecommunications network, as might be used for fourth generation (4G) cellular mobile telecommunications. As shown in FIG. 1, the network has a plurality of base stations 1 (possibly several thousand base stations in practice). Each base station 1 communicates via a radio antenna 3 with user equipment of an end user. Typically, the user equipment will be a cellular mobile telephone 5, such as a smartphone. Additionally, other kinds of user equipment may connect to the network via the base station 1, such as a notebook computer 7 having cellular telephony or Wi-Fi capability. The physical area within which user equipment such as a mobile phone 5 or a notebook computer 7 can make a radio connection to a particular antenna 3 will normally constitute a cell in the cellular telephone network. As shown in FIG. 1, multiple user equipment devices 5, 7 may connect with the same antenna 3 and communicate with the network in the same cell. The base station is commonly known as a Node B. Since the network of FIG. 1 is suitable for use in 4G cellular mobile communications, the base station 1 is most likely to be an "evolved Node B", commonly abbreviated to an "eNodeB". A base station (eNodeB) 1 operates to maintain contact with all active user equipment devices 5, 7 within its cell, and transfers messages between the user equipment devices 5, 7 and the remainder of the network, encoding messages sent to a device 5, 7 for radio transmission by the radio interface format in use, and decoding messages, received from the user equipment devices 5, 7, from the radio interface format. Additionally, if an active user equipment device 5, 7 moves from the cell controlled by one base station (eNodeB) 1 to another, the base station (eNodeB) performs the handover operation by which the radio link to that particular device 5, 7 is transferred to the eNodeB of another cell without disrupting the device's connection to the network as a whole.

In the telecommunications network of FIG. 1, each eNodeB 1 is connected to two other nodes of the network. One of these is a serving gateway 9 and the other is a mobility management entity 11. When a mobile phone 5 or notebook computer 7 is communicating with the network, the data being communicated (such as telephone speech, SMS text message data, or Internet connection data) is communicated by eNodeB 1 with the serving gateway 9. This type of communication is sometimes known as the user plane. Additionally, control information needed for running the network, such as the identity of the particular user equipment device 5, 7 that is communicating with the network, the type of connection (phone call, SMS text message, Internet data connection, etc.) that is being used, and other information required for billing, is sent to the mobility management entity 11. This aspect of the network is sometimes known as the control plane.

In the network of FIG. 1, data is transmitted in data packets using Internet Protocol (IP), and the serving gateway 9 communicates the data packets, carrying data in the user plane to and from the user equipment device 5, 7, with a packet data gateway 13 (also known as a PDN gateway), which in turn exchanges those data packets with a packet data network. As shown in FIG. 1, communication may be made with different packet data gateways 13, for communication with different packet data networks. As shown in FIG. 1, each eNodeB 1 may be connected through a serving gateway 9 to one packet data gateway 13 for exchange of data packets with the remainder of the same telecommunication network 15 (identified as "own network" in FIG. 1). Communication with a different packet data gateway 13 may be used for communication with a similar packet data network 17 operated by another telecommunications network operator. This would be used, for example, in the case of a voice call from one cellular mobile phone 5 to another cellular mobile phone which is on a different network. The same base station 1 may communicate through the serving gateway 9 with a third packet data gateway 13 for communication to the Internet 19.

Every base station 1, serving gateway 9, mobility management entity 11 and packet data gateway 13 is a node in the telecommunications network. Additionally, the network shown in FIG. 1 is highly simplified, and in practice there will be further nodes associated with the base stations 1, in addition to the serving gateway 9, the mobility management entity 11, and the packet data gateway 13, in order to provide further functions. Additionally, the remainder of the operator's own network 15 will contain many other network nodes. The network arrangement shown in FIG. 1 is merely one example of a possible telecommunications network. In other examples the communications in the user plane and the control plane may use the same nodes, rather than separate nodes being provided as in FIG. 1. Additionally, although FIG. 1 shows a network which is entirely packet switched, other telecommunications networks may use other arrangements, for example the network may have a circuit switched part and packet switched part.

In order to ensure that the network operates properly, the network operator will have to perform various administrative and monitoring operations. For this reason, the network operator typically maintains one or more operations and maintenance servers 21 connected to its network. These will run various administrative program applications, some of which will perform administrative tasks automatically and some will interact with administrative staff to enable control of the network. In order for the operations and maintenance of the network to be performed effectively, the applications running on the operations and maintenance servers 21 need to receive information about events taking place in the network. Additionally, the operator will normally wish to store event information in a database for subsequent analysis, and also to allow investigation of past states of the network in case it is needed for an investigation into a network failure or other incident.

Consequently, almost every node in the network will run administrative applications that log information about some or all of the events that take place at that node, and then event reports containing information about the events will be sent for analysis by an appropriate event-based management application running on one or more of the operations and maintenance servers 21. For example, each eNodeB 1 may send an event report in respect of every handover operation it performs as a user equipment device 5, 7 moves from one cell to another. When a user begins a communication session (e.g. makes a phone call or begins an Internet session), the serving gateway 9 may log information about the event (including for example information about the user equipment device making the request and an identification of the packet data network requested), and a report of that event will be sent.

As can be seen in FIG. 1, each serving gateway 9 and mobility management entity 11 provides services for several base stations 1. Nevertheless, it is not possible for a serving gateway 9 or a mobility management entity 11 to provide services for all of the base stations in the network, and therefore each serving gateway 9 and mobility management entity 11 is connected to a group of base stations 1 in a particular geographical area. Typically, a mobility management entity 11 will be connected to more base stations 1 than a serving gateway 9, because the processing load on a mobility management entity 11 is normally smaller than the processing load on a serving gateway 9. Consequently, as a user equipment device such as a mobile phone 5 or notebook computer 7 moves from cell to cell, it may happen that it is necessary not only to hand over communication with the device 5, 7 from one base station 1 to another but it may also be necessary to hand communication over from one serving gateway 9 to another or from one mobility management entity 11 to another. Handovers at this level may also be reported in event reports from the nodes concerned. As will be familiar to those in the art, many other types of event report may be generated within the network and sent to the operations and maintenance servers 21.

Figure 2:
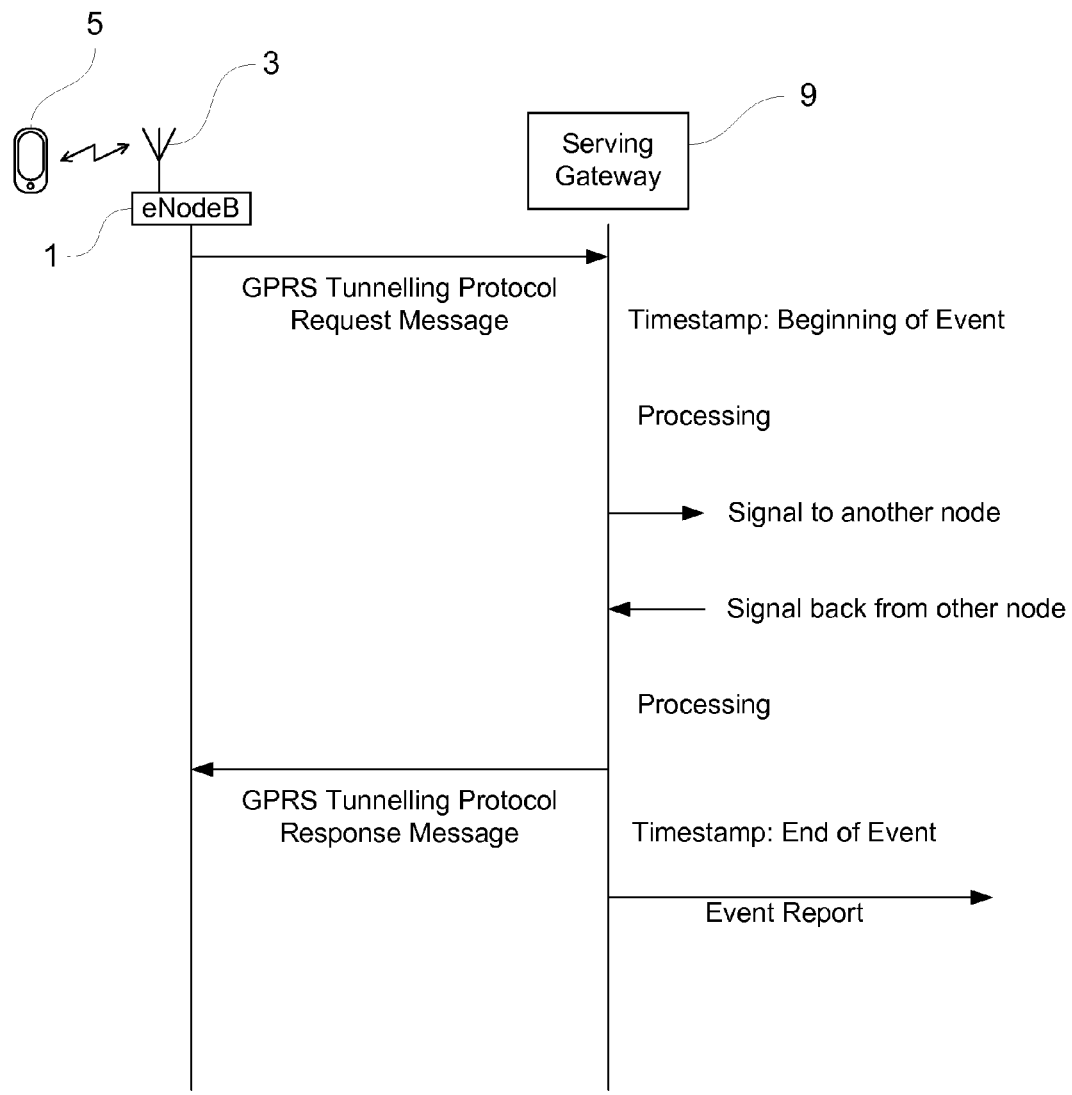
FIG. 2 shows an example of a procedure for creating an event report.

FIG. 2 shows an example of the procedure by which an event report is created. In this case, a GPRS tunnelling protocol request message is sent by a mobile phone 5, and is forwarded by a base station 1 to a serving gateway 9. The serving gateway 9 responds to receipt of the request message by recording a timestamp for the beginning of the event. It then begins processing the request. The details of the processing will depend on the details of the GPRS tunnelling protocol request, and will probably involve the communication of signals with at least one other node such as a mobility management entity 11 or a packet data gateway 13, and further processing is likely to be required when replies are received from the other node or nodes. As well as processing the request, the node will record details of the request and information about the actions it carries out. Once all processing is completed, the serving gateway 9 will send a GPRS tunnelling protocol response message back to the mobile phone 5 via the base station 1, and will record another timestamp to mark the end of the event. The serving gateway 9 will then assemble the information required for the event report, including an event type to identify the type of event being reported, the timestamps for the beginning and end of the event, information about the user equipment device (in this case the mobile phone 5) involved, such as the IMSI (International Mobile Subscriber Identity, which identifies the SIM card in the mobile phone 5), and the IMEI (International Mobile Equipment Identity, which identifies the actual mobile telephone device 5 being used), the identify of the radio cell in which the mobile telephone 5 is located (this may be the ID of the base station 1 that passed messages between the mobile phone 5 and the serving gateway 9), information about the packet data network and the service requested, such as an Access Point Name (APN), packet bearer information, and information about the event outcome (such as whether the request was accepted or denied). This information is assembled into an event report, which is a collection of data relating to the event, according to a predefined format.

Figures 3A, 3B:
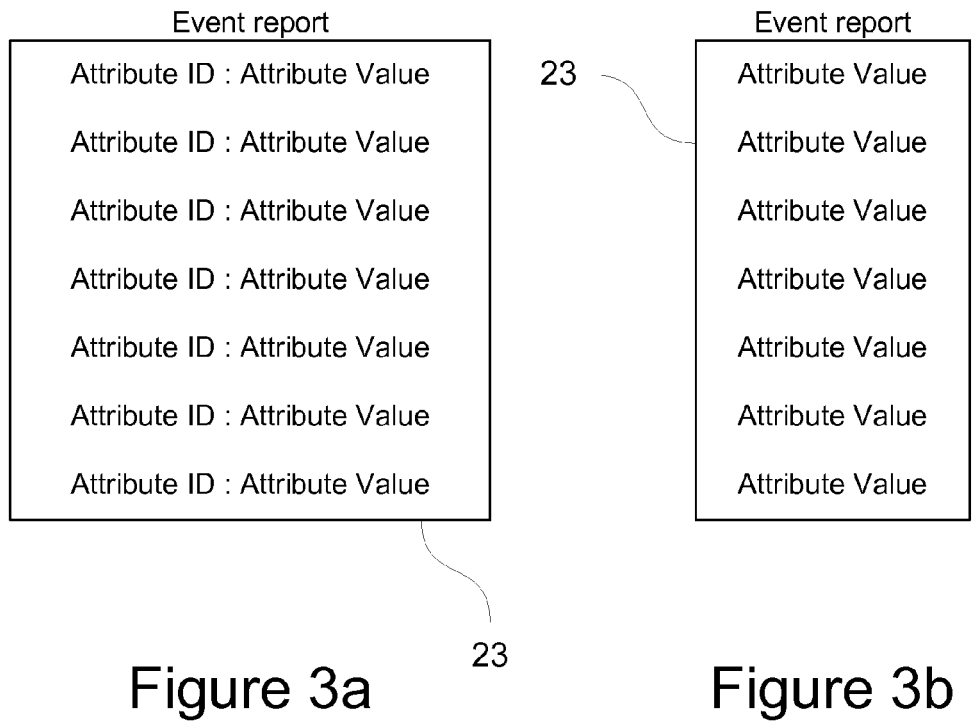
FIG. 3(a) shows an example an event report including data values and IDs.
FIG. 3(b) shows an example of an event report with data values only.

Each item of information may be regarded as an attribute of the event, so that the data for the event report is or includes a series of attribute values. In the predefined format, each attribute value may be associated with an attribute ID that identifies the nature of the attribute (IMSI, IMEI, Cell ID, APN, etc.), or the format may provide only the attribute values in a specified order, on the basis that when the event report is analysed at an operations and maintenance server 21 the nature of each attribute can be deduced from its position in the event report. FIG. 3a shows an event report 23 as a set of attribute IDs together with the attribute value for each attribute ID, and FIG. 3b shows an event report 23 simply as a list of attribute values (listed in a predetermined order).

Once the event report has been placed in its predefined format, it can be encoded into binary data for transmission using predefined encoding rules such as rules specified under Abstract Syntax Notation 1 (ASN.1), or for example encoding rules based on XML format or Google Protocol Buffers. The binary data is then packeted according to the data packeting protocols in use in the network, and sent to the operations and maintenance servers 21.

Figure 4:
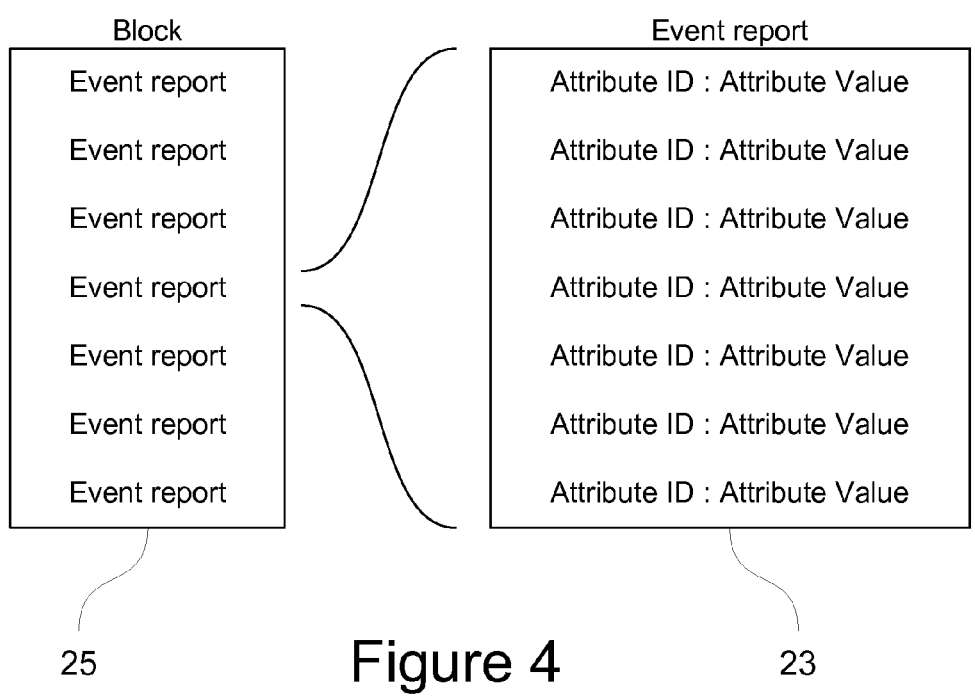
FIG. 4 shows an example of a block of event reports.

Depending on the precise details of the event reporting application or applications running at the node concerned (in this case the serving gateway 9), each event report may be sent separately, or several event reports may be gathered together into a block, and then the block sent as packet data. FIG. 4 shows a block 25 of event reports, each event report 23 in the block being a set of attribute IDs together with the attribute value for each attribute ID as in FIG. 3a. The event reports 23 in the block 25 could instead be simply lists of attribute values (in the correct order), as shown in FIG. 3b.

A large telecommunications network may have thousands or tens of thousands of nodes, each of which is generating a stream of event reports 23, and event reports may be created at a rate of up to one million events per second during busy periods in the network. Various event-based management applications in the network use these event reports, and in order for these management applications to function correctly each management application must receive the event reports that it needs. The need to route these event reports correctly to the appropriate management applications places a significant additional workload on the network, especially because routeing the event reports is not straightforward.

In principle, a node generating an event report might know which management application requires that report, and could address the data packet containing the report to the appropriate application. However, in practice this is not always a workable solution for several reasons. For example, a particular event report may be needed as input to more than one management application. Therefore simply sending the event report addressed to one management application is not sufficient. Either the node has to duplicate the event report (in practice, duplicate the data packet containing the event report) and address separate copies to different management applications, or the network needs to include some process at the management application to which an event report is addressed or somewhere in the path from the sending node to that management application, which will intercept the event report and copy it to other management applications that need it.

Additionally, a network operator may wish to modify and update its network management systems from time to time, and may introduce new management applications that will use data from existing types of event reports, or may modify existing management applications so as to change the particular event reports that it requires. Similarly, as the network management system is revised, some management applications may become redundant and be removed from the system. Therefore any information stored in a node that generates event reports, to tell the node what management application needs to receive a particular event report, is likely to become out of date. Unless this information is updated in all relevant nodes throughout the network every time the requirements of the network management system change, the network will have to include some arrangement for intercepting event reports and ensuring that they are forwarded or copied to the management applications that actually need them. If the network has dedicated event information routeing and forwarding applications running at appropriate points in the network, it will be much easier to ensure that these are kept up to date with changes in the needs of the network management system because there will be far fewer such event information routeing and forwarding nodes than the total number of event-generating nodes.

Figure 5:
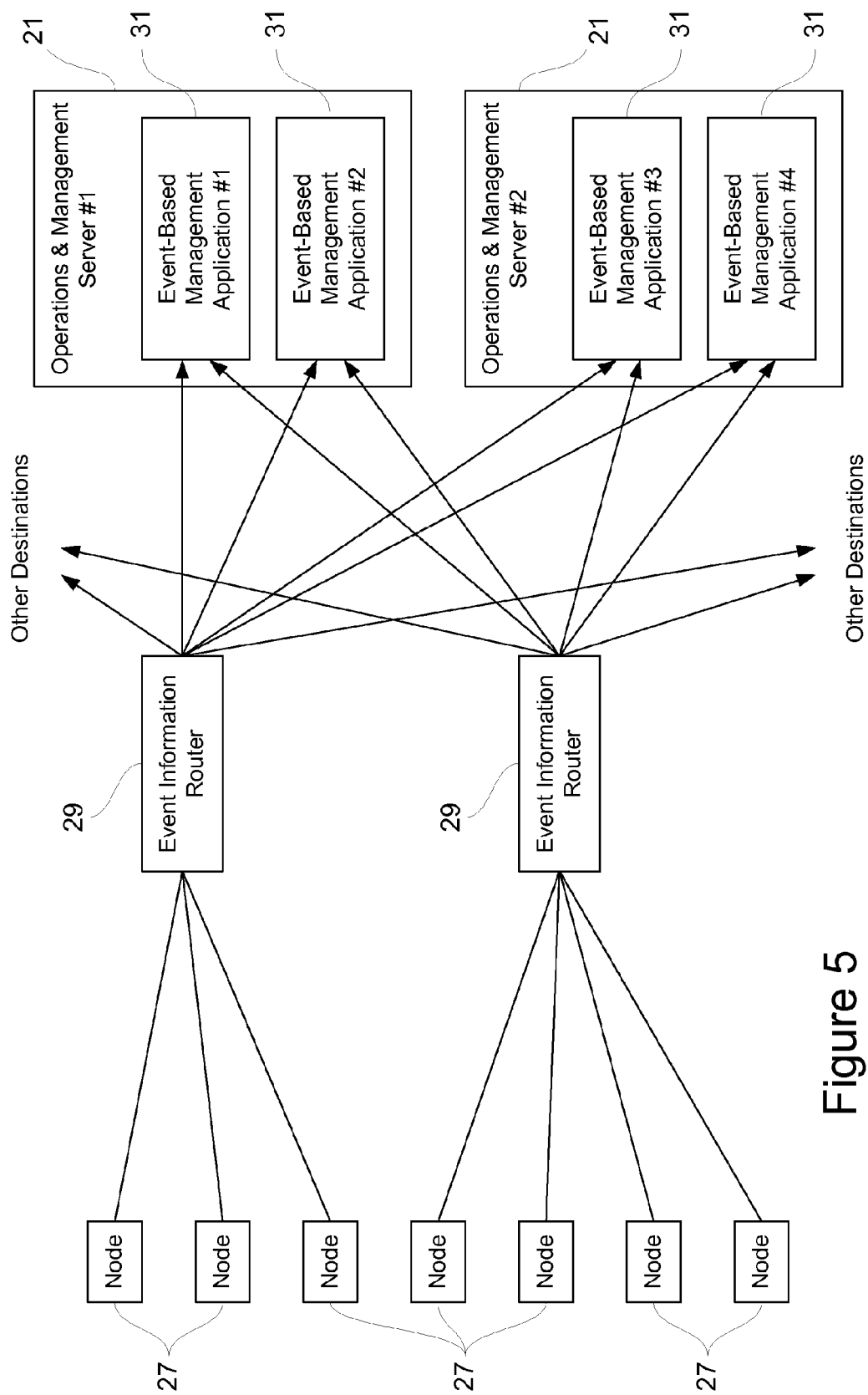
FIG. 5 shows schematically a way in which event information may flow in telecommunications network.

Consequently, the route of event reports through the network to the management applications may be similar to that shown in FIG. 5.

In FIG. 5, nodes 27 generate event reports that are passed through the network to be concentrated at a relatively small number of event information routers 29. Each node 27 generating event reports may be an eNodeB (base station) 1, a serving gateway 9, a mobility management entity 11, a packet data gateway 13, or some other node in the network. An event information router is (or is part of) a node in the network. An event information router 29, when it receives an event report, will examine the report and, based on its knowledge of which management applications require which event reports, will forward it to the management application 31 that will use it. The management application 31 can be referred to as an event-based management application (or EBM), since it uses information about events to perform its network management function. The network management system is likely also to include management applications that do not use event reports. Since any particular event report may be used by more than one event-based management application 31, an event information router 29 may forward an event report simultaneously to multiple EBMs 31.

Each event-based management application 31 will normally be running on an operations and maintenance server 21, and the event information router 29 may comprise software and/or hardware in the same operations and maintenance server 21 as the event-based management application 31 to which it sends the event report. In that case, the operation of forwarding the event report to the management application 31 can take place entirely within the server and does not require further communication over the network. However, a network operator will normally have more than one operations and maintenance server 21, and different operations and maintenance servers 21 may even be located at different sites. Therefore even if an event information router 29 is part of an operations and maintenance server 21, it will normally need to be able to forward an event report over the network in order to send it to an event-based management application 31 running on a different operations and maintenance server 21. It is also possible for an event information router 29 to be at a different node in the network, and not be part of an operations and maintenance server 21. In practice, any particular event report may pass through more than one event information router 29 on its path from the node 27 that generated it to the event-based management application 31 that uses the report.

A node 27 that generates the event report may address the data packet, containing the event report, to an event information router 29. In this case, the event information router 29 will change the destination of the packet in the packet header when it forwards the packet. Alternatively, the data packet may initially be addressed to an event-based management application 31 by the node 27 that generates it, and the event information router 29 may operate in a "packet sniffing" mode in which it investigates the contents of a packet passing through it and modifies, forwards or copies the packet accordingly.

One advantage of this type of arrangement for routeing event reports is that the nodes 27 that generate the event reports do not need to know which management applications 31, or even which type of management applications 31, need to receive any particular event report. Each event-based management application 31 can "publish" its particular requirements for event reports to the event-report routers 29, which can analyse the event reports and route them accordingly. However, this system does require each event information router 29 to acquire sufficient knowledge about each event report to be able to route it correctly. This may require substantial processing at the event information router 29.

Any given node 27 is likely to generate event reports in respect of several different kinds of events, so that not all event reports from a particular node 27 need to be sent to the same event-based management application 31. Therefore, the event information router 29 cannot route event reports simply on the basis of the originating node information included in the packet header of the data packet containing the event report. The node 27 generating the event report will normally include, as one of the data values or attribute values in the event report, an identification of the type of event that is being reported. While this information may assist the event information router 29 in routeing the event report correctly, this information also may not be adequate in all cases. For example, a network operator may wish to be able to monitor and analyse network operations in which end users make use of a particular service on a particular data network (which may be a data network other than the network operated by the network operator concerned). As a result, one or more event-based management applications 31 may require event reports, such as a report of a GPRS tunnelling protocol request as discussed in FIG. 2, in which the access point name (APN) identifies a particular operator on a particular network. Accordingly, when an event information router 29 receives an event report that is identified as a report of a GPRS tunnelling protocol request, the event information router has to access the event report information in the event report in order to determine whether the access point name matches the requirement of that particular event-based management application 31. Therefore the event information router 29 will need to decode the event report from the binary data form used in the packet data that arrives at the event information router 29, using decoding rules that match the encoding rules used to encode the event report into binary data in the node 27 that generated it. Having decoded the event report, the event information router 29 will have to analyse the decoded report to locate the relevant item of information (often known as the relevant "attribute") in the event report, and check its data value (i.e. its attribute value).

Different types of node in the network will report different types of event, and consequently they may provide event reports of different lengths, and even where event reports of different types of event have the same size, the particular items of information (attributes) in event reports of different types will be different. Furthermore, in a large scale complex telecommunications network, nodes of different type may be provided by different manufacturers, and may use different encoding rules to transform the event report from its predefined format into binary data for transmission, so that the event information router 29 needs to select the decoding rules appropriately for each event report. Even nodes 27 that are nominally of the same type may in fact originate from different manufacturers, or even if they originate from the same manufacturer may be running different software updates, and therefore may be using different encoding rules. Because of the variety of encoding rules that the event information router 29 may have to use, and the variety of event report formats and length that may occur in the event report once decoded, the operations of the event information router 29 will normally require the flexibility of a processing slow path, in which decoding and analysis operations are carried out by programs running under the control of the operating system of a processor in the node at which the event information router 29 exists. As a result, event information routeing operations in a network can consume considerable system resources (in terms of processor time, memory space, etc.), with consequent costs for the network operator in providing and maintaining those resources and in operating them.

An embodiment of the present invention proposes to accompany or replace an event report, or a block of event reports, with a summary. The summary can be interrogated so as to obtain meta-information about the data values (attribute values) of at least one of the items of information (attributes) relating to the event or events that it summarises. Typically, the summary can be interrogated to obtain information about the data values of more than one of the items of information relating to an event, but not necessarily all of the items of information relating to an event or all of the items of information included in an event report of the same event. The more information that is included in a summary, the longer the summary will tend to be, and so there is often no benefit in including more information in the summary than is needed. Preferably the summary allows information to be obtained about the type of event that it relates to. On the other hand, it will normally not include information about the identity of the node where the event took place since this can usually be obtained from the "from" address information in the packet header. The term "meta-information" means information about information, and interrogating the summary does not necessarily generate the value for any particular attribute, although in some cases it may do so. Instead, the summary can be used to answer questions such as whether a particular attribute of the event has a particular value, or whether each of several particular attributes have particular respective values. Preferably, the summary is included in a data packet in a form such that it can be interrogated without the need to decode it once it has been retrieved from the data packet, unlike an event report which needs to be decoded using the appropriate decoding rules that match the manner in which it was encoded.

When a node has to route a data packet towards the appropriate event-based management application or applications, and the data packet includes a summary, the node will normally be able to identify what routeing is required on the basis of the meta-information obtained by interrogating the summary. Therefore it ceases to be necessary to decode and analyse an event report in order to route the data packet correctly. Particularly in the case that the summary can be interrogated without decoding, this will normally increase the speed with which the routeing of such data packets can be performed, and will reduce the processing load at the node that performs the routeing. Even in the case that the summary is encoded, and has to be decoded before it can be interrogated, substantial savings in time and processing resources can be obtained if the summary is shorter than the total of all the data values that it summarises. Specifically, if the total length of the summary when placed in binary form for transmission in the data packet is less than the total length of all of the data values about which meta-information can be obtained by interrogating the summary, when the data values are placed in binary format for transmission in a data packet (i.e. the summary has a smaller data size than the total data size of all the data values about which meta-information can be obtained from the summary), then the amount of processing required and the time taken to decode the summary will be less than the time taken and processing required to decode the corresponding event report or block of event reports, so that the use of the summary still provides a saving of time and required processing resources.

One way of generating these summaries will now be described.

Figure 6:
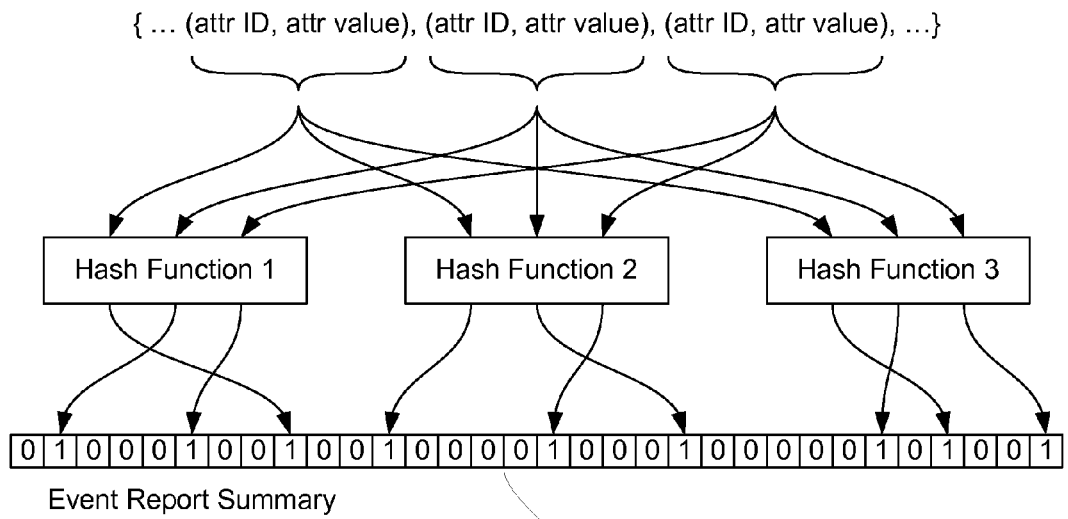
FIG. 6 illustrates the creation a summary of an event report in an embodiment of the invention.

In the present embodiment, a summary of an event report is created by a process illustrated in FIG. 6. First, each attribute value that will be used to create the summary is associated with an attribute ID, so as to create a set of data pairs. The attribute ID can be the ID code that is used to identify the attribute value in an event report 23 of the type shown in FIG. 3a, in which both IDs and values are included in the report. Alternatively, if no such IDs are available and any event report 23 would merely be a list of the attribute values in the correct order as shown in FIG. 3b, the attribute ID for the process shown in FIG. 6 can simply be the offset value (i.e. the position in the list) that the attribute value would have when included in an event report. The precise nature of the attribute ID is not important. All that is necessary is that each data pair contains a data value and something to identify which item of information about the event the data value relates to.

Each data pair is then input to one or more hash functions. In general, the existence of a particular data pair in the input (i.e. a particular attribute value together with a particular attribute ID) will result in the hash function setting an output value at a particular location in its output. However, it is possible that several different data pairs input to the hash function may result in an output value being set at the same location in the hash function output (this is sometimes known as a collision in the hashing operation). Consequently, the presence of the value at that location in the hash function output does not identify which of the several different data pairs was present in the input. In order to distinguish between different inputs that collide and result in the same hash function output, it is preferred to use more than one hash function, and preferably the hash functions should be independent and uniformly distributed so as to maximise the ability of one hash function to distinguish between input data pairs that collide in the other hash function or functions. Examples of suitable known hash functions are MD5, murmurHash, and hashmix.

In order to create the summary, the outputs of the hash functions are combined, for example in a Bloom filter. The resulting data, which will normally be in the form of a succession of binary values, is the summary 33 of the event report.

Normally, the summary will have a smaller data size than the total data size of all the data values about which meta-information can be obtained from the summary, as discussed above. If the summary is or includes a Bloom filter, its size will be determined, at least in part, by the predetermined size of the Bloom filter, and so it is possible that, if very few items of information (attributes) are used to create the summary, the summary may in fact have a larger data size than the total data size of all the data values about which meta-information can be obtained from the summary, but in this case the summary can still be expected to have a smaller data size than the entire event report.

Even if the summary has a larger data size than the total data size of the entire event report, there will still be a processing advantage if the summary can be interrogated without the need to decode it, since the processing time and resources that would be used to decode the event report can be avoided.

When it is stated that the summary can be interrogated without decoding, and the summary is transmitted in a data packet, some operations may still be required to retrieve the summary from the data packet even though the summary (once retrieved) can be interrogated without decoding. For example, it may be necessary to account for bit- or byte-packing in the data packet. Additionally, data in the data packet may in some cases be treated as being in standard length words or bytes, for example as a succession of 8-bit bytes, whereas the summary will normally be a much longer succession of bits, so that the summary is treated as being composed of multiple words or bytes when it is packed into the data packet. Depending on whether the data packet uses big-endian or little-endian rules for packing words or bytes into the packet, the process of retrieving the summary from the data packet may include re-ordering the bits as compared to the order in which they are present in the data packet. However, this is not regarded as decoding the summary, since this operation arises from the way in which binary data is packed into the data packet, whereas "decoding" refers to a further operation that needs to be conducted on the binary data after the binary data has been retrieved from the data packet (such as converting the binary to another format using ASCII, ASN.1 or Google Protocol Buffer decoding rules).

Figure 7:
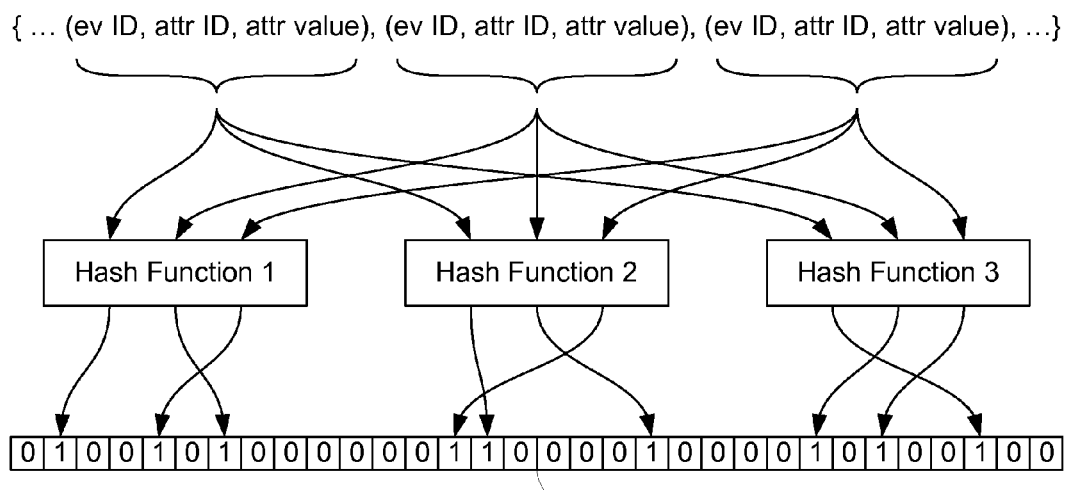
FIG. 7 illustrates the creation a summary of a block of event reports in an embodiment of the invention.

As noted above, a block may be formed, containing more than one event report, before transmission towards the management application or applications. If it is desired to produce a summary 33 for a block as a whole, rather than a summary for a single event report, the method described above can be slightly modified, as shown in FIG. 7. In this case, the data values to be used in creating the summary 33 are assembled into a set of data triplets rather than data pairs. In addition to the attribute value and the attribute ID, each data triplet also includes an event ID that serves to identify which event report, in the block of event reports, the data value relates to. The hash functions are therefore performed on input triplets rather than input pairs of data. As can be seen in FIG. 7, the method for forming the summary is otherwise as described above with reference to FIG. 6.

The methods described with reference to FIGS. 6 and 7 create summaries 33 that are each in the form of a binary sequence that can be interrogated without decoding. Because the summary is already in binary, it can be placed in a data packet without further encoding, and therefore no decoding is needed when it is recovered from the data packet for interrogation. The summary 33 can be placed in the payload of the data packet. For example, if an event report is being transmitted in a data packet, the summary may be placed in the payload immediately ahead of the event report. Alternatively, the summary 33 may be placed in the packet header if there is an appropriate space in the header format and the summary is short enough. This speeds up recovery of the summary at a node that wishes to interrogate it since the node will normally have to read the packet header anyway, and this avoids the need for the node to read the payload of the packet.

Figure 8:
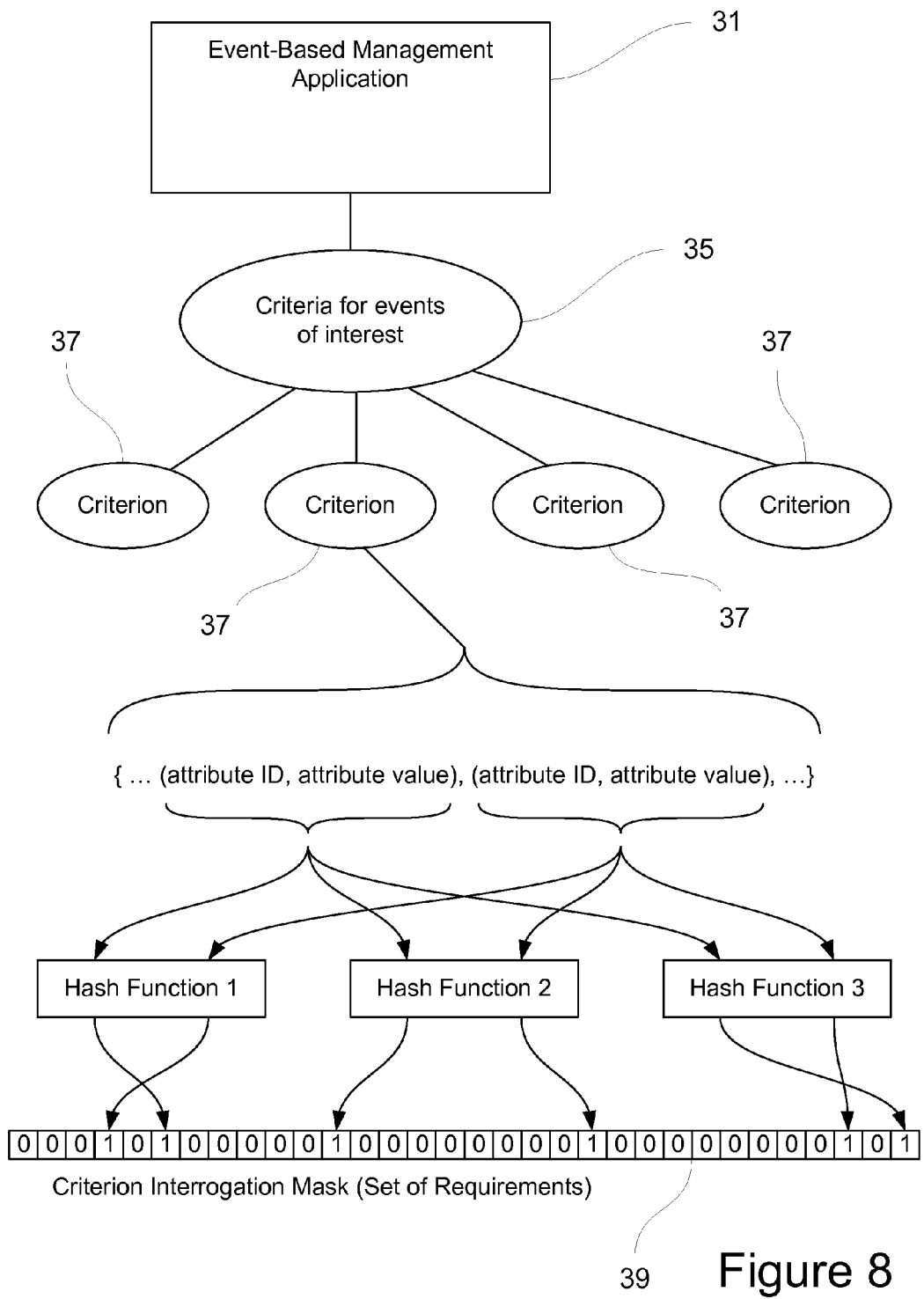
FIG. 8 illustrates the interrogation of a summary of an event report in an embodiment of the invention.

A node that receives a data packet that includes a summary 33 of an event generated by the method described with reference to FIG. 6 can interrogate that summary 33 by a process that will be described with reference to FIG. 8.

An event-based management application 31 is associated with a set 35 of criteria that define the events about which the EBM application 31 needs to receive information. This set 35 may, for example, be created as part of the process of writing the EBM application 31. The set 35 of criteria may be very simple, and may for example consist of only a single criterion, which in turn may be very simple and may simply specify that the EBM application 31 requires information about all events of a particular event type, or perhaps all events of a particular event type where one particular other event attribute has a specific attribute value. However, there may also be event-based management applications 31 that have more complex criteria, and an EBM application 31 may for example need to receive information about all events having one particular combination of specific values for particular attributes and also receive information about all events having another particular combination of specific values for another set of particular attributes.

The set 35 of criteria defines one or more individual criteria 37 such that each criterion 37 is a set of data pairs, each data pair containing an attribute ID to identify a particular attribute in the event information together with an attribute value identifying the required value for that attribute, in the same way as the data pairs in FIG. 6. Each criterion 37 may comprise one such data pair or more than one. If a criterion 37 comprises more than one set of data pairs, the criterion requires the event information to include all the data values defined by the sets of data pairs. That is to say, the criterion is satisfied only in the case that the event information has the specified attribute value for each of the attributes identified in the data pairs of the criterion. Accordingly, the criterion 37 (or each criterion 37 in the case that there is more than one of them) can be defined as a set of data pairs as shown in FIG. 8, in the same way that the event information used to create the summary is defined as a set of data pairs as shown in FIG. 6. Normally the set of data pairs in FIG. 8 for a criterion 37 will contain fewer data pairs than the set of data pairs used in FIG. 6 to create the summary.

For each criterion 37, the individual data pairs in the set are input to the same hash functions as are used to generate the summary 33. Once all of the data pairs in the criterion 37 have been hashed, the hash results are combined in the same way as the hash results of FIG. 6 were combined to create the summary 33. This creates a set of requirements 39, that will be met by the summary 33 if the event information used to create the summary 33 meets the criterion 37. In the case that the summary 33 is in the form of a binary sequence (i.e. a succession of binary values), the set of requirements 39 will also be a binary sequence (i.e. a succession of binary values) and should normally have the same length (i.e. have the same number of binary values) as the summary 33. The set of requirements 39 can then be applied to the summary 33 to determine whether the summary 33 meets the requirements of the criterion 37.

Since the set of requirements 39 has the same length as the summary 33, it can be regarded as a mask to be used in interrogating the summary 33, in the sense that the set of requirements 39 can be considered to be overlaid on the summary 33 and it is only necessary to consider the values of the summary 33 in positions where there is a hash function output in the set of requirements 39. Since the number of data pairs defined by the criterion 37 is normally much smaller than the number of data pairs used to create the summary 33, it will normally be the case that only a small proportion of the binary values in the set of requirements 39 will represent outputs from any of the hash functions, and therefore it can be understood that most of the binary values in the summary 33 can be ignored and only a small number of them need to be taken into account when determining whether the summary 33 meets the criterion 37.

There are various ways in which the operation of interrogating the summary 33 with the set of requirements 39 can be carried out in practice. Normally, the process for creating the set of requirements 39 will result in a binary "1" at every position where there is a hash function output. Therefore the all "1"s in the set of requirements 39 need to be matched in the summary 33 but all the "0"s represent positions where the value of the summary 33 does not matter. In this case, it is possible to align the set of requirements 39 and the summary 33 and perform a bitwise AND operation. This will result in a value "0" at each position where the interrogation mask (set of requirements 39) is "0". It will also result in a value "0" at each position where the summary 33 is "0". The result of the bitwise AND operation will be a "1" only at the positions where the both the interrogation mask (set of requirements 39) and the summary 33 have a "1". Therefore the result of the bitwise AND operation will be identical to the interrogation mask (set of requirements 39) if (but only if) the summary 33 meets the criterion 37. If the summary 33 does not meet the criterion 37, the result of the bitwise AND operation will include a "0" in at least one position where the interrogation mask 39 has a "1". Accordingly, if the result of the bitwise AND operation is recombined with the interrogation mask 39 in a bitwise XOR or bitwise NAND operation, the result will be entirely zeros if (but only if) the summary 33 had a value 1 at each position required in the interrogation mask (set of requirements 39).

Therefore, in this method the summary 33 and the set of requirements 39 are compared in a bitwise AND operation, and the result is re-compared with a set of requirements 39 in a bitwise XOR or NAND operation, and the end result is tested to see if has the value zero. If it has value zero (i.e. all values in the output are "0"), the summary 33 meets the criterion 37. If it is non-zero, there is at least one position in the summary 33 that has a "0" where the set of requirements 39 requires a "1", and therefore the criterion 37 is not met.

The process described above provides a simple and straightforward way of interrogating the summary 33 to see whether it meets one particular criterion 37. However, if the summary 33 must be interrogated with a large number of sets of requirements 39, to check whether it meets any of the corresponding criteria 37, it may still require significant time and processing capacity to check the summary 33. This situation may arise in practice because any given event information router 29 may be checking the summaries 33 on received data packets against the set 35 of criteria for several different event-based management applications 31, and also because, as discussed above, it is possible for a single event-based management application 31 to be associated with a complex set 35 of criteria so that several criteria 37 have to be checked for a single EBM application 31.

Additionally, if the summary 33 and the set of requirements 39 are not created by the method discussed above using hash functions and a Bloom filter, but are created using a different summarising function such that the set of requirements 39 requires the summary 33 to have value "0" at some positions and value "1" at other positions, the procedure using a bitwise AND operation is not suitable.

An alternative way of interrogating the summary 33 involves storing each set of requirements 39 in a content-addressable memory (CAM), preferably a ternary content-addressable memory (TCAM). If a TCAM is used, then for each position in a set of requirements 39, if the data value at that position needs to be checked against a corresponding value in the summary 33, the data value is stored in the corresponding position in the entry for the set of requirements in the TCAM. However, at each position in a set of requirements 39 where the corresponding value in the summary 33 is not to be checked, the "don't care" value is stored in the TCAM. Thus, in the example shown in FIG. 8, the set of requirements 39 would be stored in the TCAM with every "0" replaced by "don't care" and every "1" stored as "1". If all the sets of requirements 39 are stored in the TCAM, the summary 33 can be interrogated with respect to all of the criteria 37 by using the summary 33 to address the TCAM. The TCAM will then return all of the memory locations (if any) at which the stored set of requirements matches the summary 33, taking account of the "don't care" values. This operation allows a summary 33 to be interrogated with multiple sets of requirements 39 rapidly in a single operation.

The result of interrogating the summary 33 can be regarded as meta-information, since it is information about the data value of at least some of the items of information in the event information used to generate the summary. Depending on how the summary 33 is generated, it may not be possible to identify that a particular item in the event information has a particular value, for example if the summary 33 is generated using a hash function that provides the same hash output for all data values within a specified range for a particular item of information. In this case, it is only possible to conclude that the data value for that item of information is within the specified range, but the exact value cannot be recovered from the summary 33. The fact that the summary 33 meets the requirements 39 of a particular criterion 37 is itself an example of meta-information about the event information. This meta-information is sufficient to allow the event information to be routed to the EBMs 31 that need it, and can be obtained from the summary 33 more easily than the full event information can be recovered from the event report 23.

Once the event information router 29 has interrogated the summary 33, it can use the results of the interrogation to process the corresponding data packet appropriately. For example, the set 35 of criteria associated with a particular event-based management application 31 may correspond to a single criterion 37. In this case, if interrogation of the summary 33 indicates that this criterion 37 is satisfied, the event information of the data packet should be sent to that EBM application 31, for example by sending the data packet (or a copy of it) to the EBM application 31, or sending just the summary 33, or decoding the event report (or block of event reports) in the data packet and sending the event report (or at least one of the event reports from the block) to the EBM application 31.

If the set 35 of criteria for an EBM application 31 is more complex, and corresponds to several criteria 37, the event information router 29 may need to perform an extra operation to see which of the criteria 37 are met in order to decide whether the data packet contains event information relevant to the EBM application 31. However, even in this case it will normally be possible for the event information router 29 to take a decision without the need to combine the interrogation results for several criteria 37. This possibility arises because it is normally possible to use standard logical transformations to rearrange any complex set of logical relationships into a set of logical AND statements combined in an overall logical OR statement. Accordingly, if the definition of the full set 35 of criteria, for indicating whether an event is of interest to an EBM application 31, is complex and requires one particular combination of values for specific attributes in one particular circumstance, and different combinations of values for different attributes in different circumstances, it is normally possible to rearrange it into a set of logical AND statements combined in an overall logical OR statement. In this case, each logical AND statement is used to define a criterion 37 for that EBM application 31, and the overall logical OR statement means that the set 35 of criteria will be complied with if any one of these criteria 37 is met.

Since the process of interrogating a summary 33 with a set of requirements 39 only yields a positive result if all of the required values in the set of requirements 39 are present in the summary 33, each criterion 37 naturally corresponds to a logical AND statement. Since the criteria 37 are logically linked by an OR requirement, it is only necessary for the summary 33 to meet any one of the criteria 37 for the event information router 29 to conclude that the corresponding event information should be sent to the EBM application 31. Therefore, when the TCAM returns the list of stored sets of requirements 39 that are satisfied by the summary 33, the event information router 29 can transform this list into a corresponding list of EBM applications 31 to which the data packet (or event information from it) should be sent. The event information router 29 then copies or forwards the data packet, the summary 33, or event information recovered from the data packet, to each EBM application 31 in the list generated in this way. Since there is a possibility that more than one criterion 37 relating to the same EBM application 31 may be satisfied, a particular event-based management application 31 may appear more than once in the list of applications to which the data packet or event information should be sent. Therefore some procedure may be required to remove or skip over such duplications, but no other procedures are required to process the logical OR relationship between the criteria 37 for the same EBM application 31.

Figure 9:
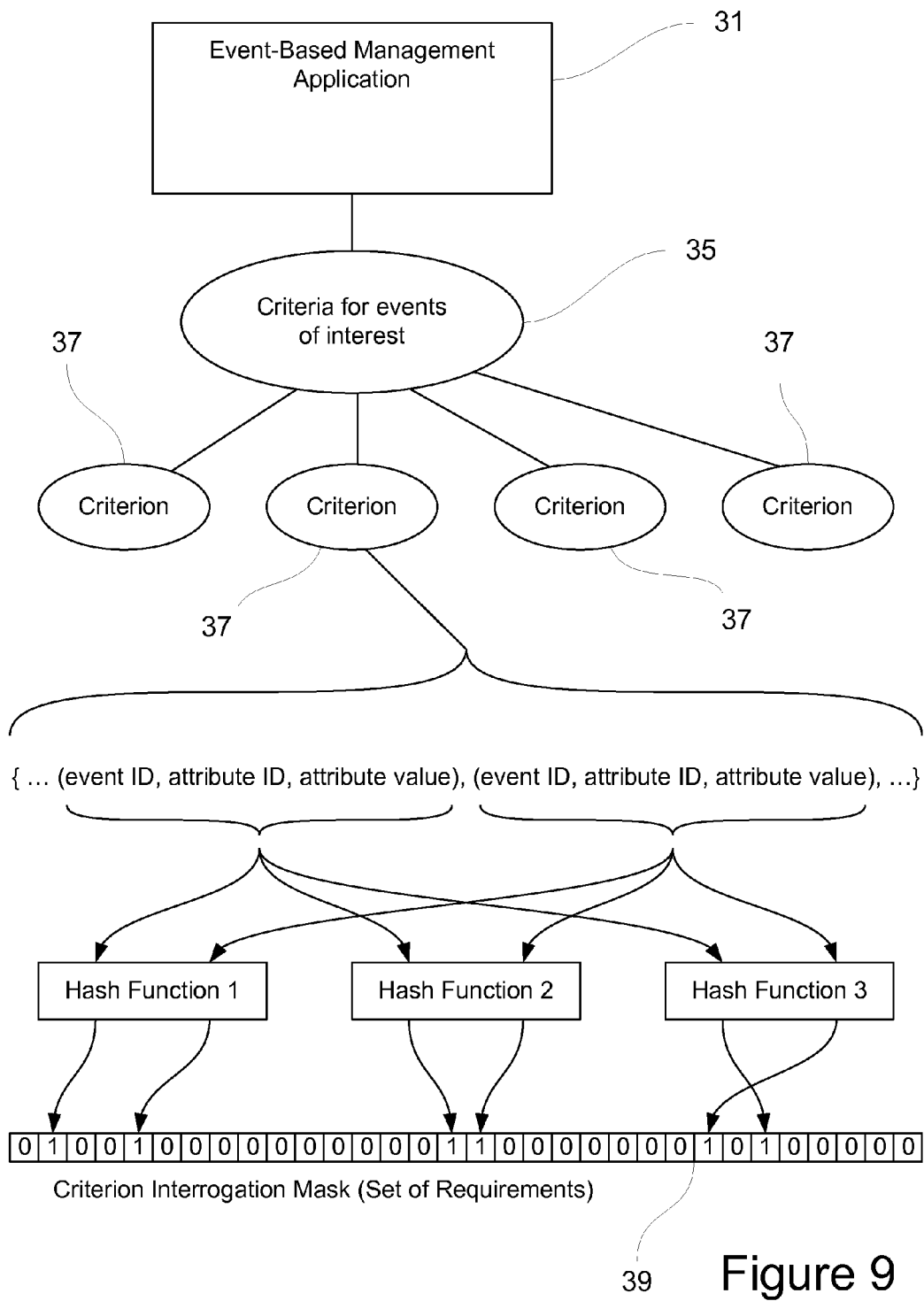
FIG. 9 illustrates the interrogation of a summary of a block of event reports in an embodiment of the invention.

As discussed with reference to FIG. 7, a single summary 33 may relate to information for multiple events, so that the summary 33 is generated using event ID information as well as attribute ID information for each attribute value. In order to interrogate this type of summary 33, each criterion 37 needs to specify its requirements in terms of data triplets in the same way as data triplets are used to create the summary 33 in FIG. 7. This arrangement is shown in FIG. 9. Apart from the use of data triplets, in which the event ID information is provided in addition to the attribute ID information and the attribute value, the procedure for interrogating a summary 33 in FIG. 9 is the same as the procedure discussed with reference to FIG. 8.

Preferably, all the event-generating nodes 27 in the network create the summary 33 in the same way, and the resulting summary 33 has the same size in all cases, so that each set of requirements 39 is suitable for use in interrogating every summary 33 regardless of which node 27 created the summary 33. In the summary generation method discussed with reference to FIGS. 6 and 7, using hash functions combined in a Bloom filter, the overall size of the summary 33 is a pre-defined feature of the Bloom filter, and is not a function of the number of items of information (attributes)

of event information used to generate the summary 33. Therefore this method of generating the summary 33 can be used with a wide variety of different types of event, and a variation in the number of items of information used to generate a summary 33, while nevertheless creating each summary 33 in the same way so as to have the same size.

However, if necessary the system can accommodate summaries of different sizes from different types of node 27, or summaries generated in different ways, provided that the type of summary is predictable. For example, it may be possible to predict the type or size of summary from the originating node identification in the header of the data packet. In this case, when a set of requirements 39 for interrogating the summary 33 is generated from a criterion 37, the method of generating the set of requirements 39 should correspond to the method of generating the summary 33 that it will be used to interrogate. If it is possible that event information meeting the criterion 37 could originate from nodes 27 of more than one type, using different respective processes for creating the summary 33, it may be necessary to generate more than one set of requirements 39 from the same criterion 37 so that there is a set of requirements 39 for the criterion 37 corresponding to each type of summary 33 that may need to be interrogated. In the event information router, there may be several TCAMs, or the TCAM may be divided into several parts, and each separate TCAM or part of the TCAM may store the sets of requirements 39 to be used with summaries 33 generated in a particular way and having a particular size. When a data packet, having a summary, is received and the summary is to be interrogated, the event information router can select which TCAM or part of the TCAM should be addressed by the summary 33 on the basis of the originating node information in the header of the data packet.

Because of the possibility of collisions in each hash function, or in the Bloom filter as a whole, it is possible that a set of requirements 39 is be used to interrogate a summary 33, and indicates that the criterion 37 is met, when in fact the event information used to create the summary does not correspond to the requirements of the event-based management application 31 as set out in the set 35 of criteria. However, the likelihood of this happening is reduced by using two or more hash functions, and by increasing the size of the Bloom filter. For most methods of generating a summary 33, the expected frequency of false positive interrogation results can be calculated. Accordingly, the details of the method used to generate the summary 33, such as the number and type of hash functions and the size of the Bloom filter, can be selected to provide an acceptably low false positive rate.

Normally, the effect of false positives will be that data packets, or event information from data packets, are forwarded to event-based management applications 31 that do not in fact require them. This results in an increase in traffic through the network and an increase in processing at the node where the relevant event-based management application 31 is running, as the false positive information is not identified as irrelevant until the corresponding event report is decoded and analysed by the event-based management application 31. However, provided that the false positive rate is sufficiently low, the wasted processing time and capacity arising from false positive identification by the event information router 29 is much less than the processing time and capacity saved in the event information router 29 by using the summaries 33 to identify relevant event information rather than decoding and analysing event reports 23 or blocks of event reports 25.

It is also possible that an event-based management application 31 does not analyse the event report at all, but performs its operations on the basis of the summary 33 alone, for example by updating a counter to maintain a key performance indicator such as the rate of failures of handover operations in a particular portion of the network. In this case, the false positives will result in the counter being incremented more quickly than it should be. However, if the frequency of false positives is predictable this can be taken into account in how the counter information is used. For example, thresholds for taking remedial action can be raised slightly to account for the slightly inflated count rate caused by false positives.

Although the network management system can normally accommodate a small rate of false positives in the identification of event information, as explained above, it is normally more problematic if there are false negatives in the identification of the event information. That is to say, it normally does not matter much if the event information router 29 wrongly selects a data packet that does not contain event information required by an event-based management application 31, and sends the data packet (or event information from it) to the EBM application 31 when it is not in fact needed, but it normally will cause a problem if the event information router 29 fails to select a data packet that does contain event information that is required by a particular event-based management application 31, and therefore fails to forward a data packet (or event information from the data packet) when it should have done so. This requirement may need to be taken into account when selecting the method for generating the summary 33. It is an advantage of hash functions that they do not create false negative outputs, but only false positive outputs, and therefore the illustrated method using hash functions and a Bloom filter will normally avoid false negatives in the operation of the event information router 29.

Although the creation and interrogation of the summary 33 has been described and shown in FIGS. 6 to 9 with reference to Bloom filters, other alternatives can be used, including known variations and modifications of Bloom filters and also other ways of using hash functions such as cuckoo hashing.

As discussed above with reference to FIGS. 8 and 9, the event information router 29 uses sets of requirements 39 corresponding to the various criteria 37. When the event-based management application 31 is originally written and implemented in the network, the set 35 of criteria may be used to identify each criterion 37. The summarising method or methods, that are known to be used in the network, may then be used to generate the sets of requirements 39, and these can then be transmitted to each relevant event information router 29. Alternatively, the task of generating the sets 39 of requirements may be passed on to the event information routers 29. For example, each event-based management application 31 may publish its set 35 of criteria over the network, so that the set 35 of criteria can be received by the event information routers 29. Each event information router 29 may then analyse the set 35 to identify each criterion 37 and then generate the relevant sets of requirements 39. If each set of requirements 39 can be generated from the corresponding criterion 37 by high speed dedicated hardware, it would be possible in principle for each event information router 29 to generate the sets of requirements 39 afresh each time it has to interrogate a summary 33. However, it is anticipated that in practice it will be more convenient and efficient for the event information router 29 to generate each set of requirements 39 once, and store the sets of requirements (for example in a TCAM as discussed above).

At least in the case of a summary 33 that can be interrogated with a set of requirements 39 (e.g. by using summary 33 to address a ternary content-addressable memory) without decoding the summary 33, it will normally be possible to design and implement a system that uses a processing fast path for interrogating the summary 33 and deciding how to route the relevant data packet or the event information in it. The fast path avoids the need for the summary to be handled by the normal procedure for handling incoming and outgoing messages within the operating system of the server that services the event information router 29 at the node where it is located. An example of such a procedure is use of the networking stack in a Linux system. Preferably, the fast path procedure for handling the summary 33 avoids any use of the operating system for the main processor of the server, and it may run entirely in specialised hardware avoiding the need for any part of the fast processing path to be performed within the main processor of the server. This both speeds up the processing of the summaries 33, and therefore speeds up the process within the event information router 29 of deciding how to route the data packet, and also reduces the processing load on the main server.

Figure 10:
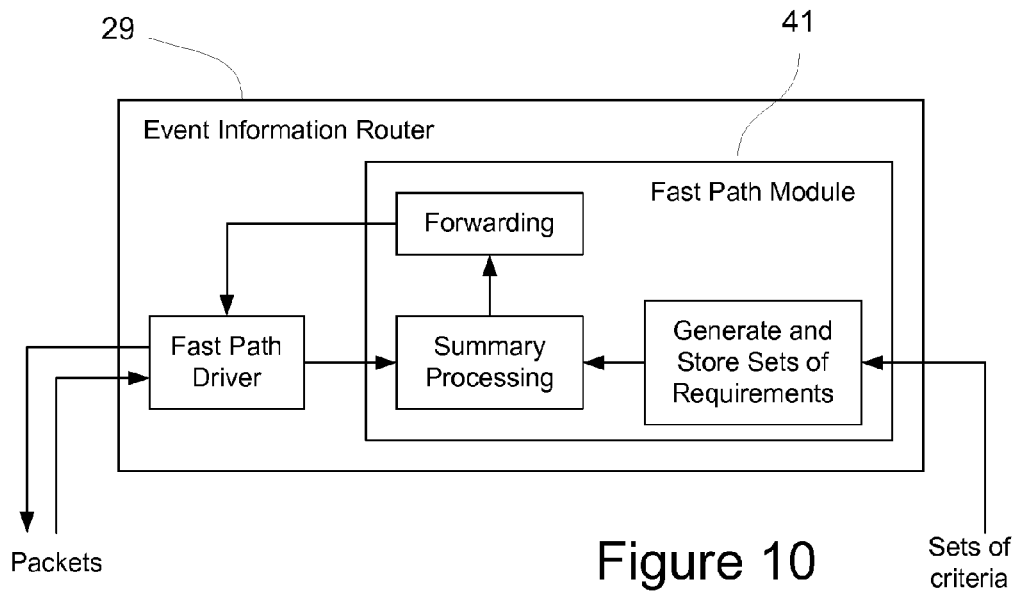
FIG. 10 illustrates the processes involved in using a summary to route event information in an embodiment of the invention using a fast path module in an event information router node.

FIG. 10 shows an example of the operations that would be performed in an event information router 29 that uses a dedicated fast path module to decide where to send data packets that have summaries 33. Sets 35 of criteria, that have been published by event-based management applications 31 in the network, are received by the event information router 29. Each criterion 37 is used to generate a set of requirements 39 that is stored within a fast path module 41, for example in a TCAM as discussed above. When a data packet having a summary 33 is received at the network interface of the relevant node, the fast path driver in the event information router 29 extracts the summary 33 and sends it to the fast path module 41 for processing. The summary 33 is processed by interrogating it with each of the stored sets of requirements 29, for example by using the summary 33 to address a TCAM in which the sets of requirements 39 are stored, as discussed above. The results of the processing are used to identify the event-based management applications 31 that need to receive event information contained in the data packet from which the summary 33 was extracted. This information is used to decide where the data packet should be forwarded to. The forwarding decision then passes back to the fast path driver, which in turn ensures that a copy of the data packet is forwarded towards each of the EBM applications 31 that need to receive it.

The operations discussed with reference to FIG. 10 assume that the event information router 29 is located at a server, and probably at a network node, that is separate from any operation and maintenance server 21 at which an event-based management application 31 is running. However, it may also be necessary to provide appropriate routeing for data packets containing event information when those data packets are received at an O&M server 21, and the operations performed in this case are shown schematically in FIG. 11.

Figure 11:
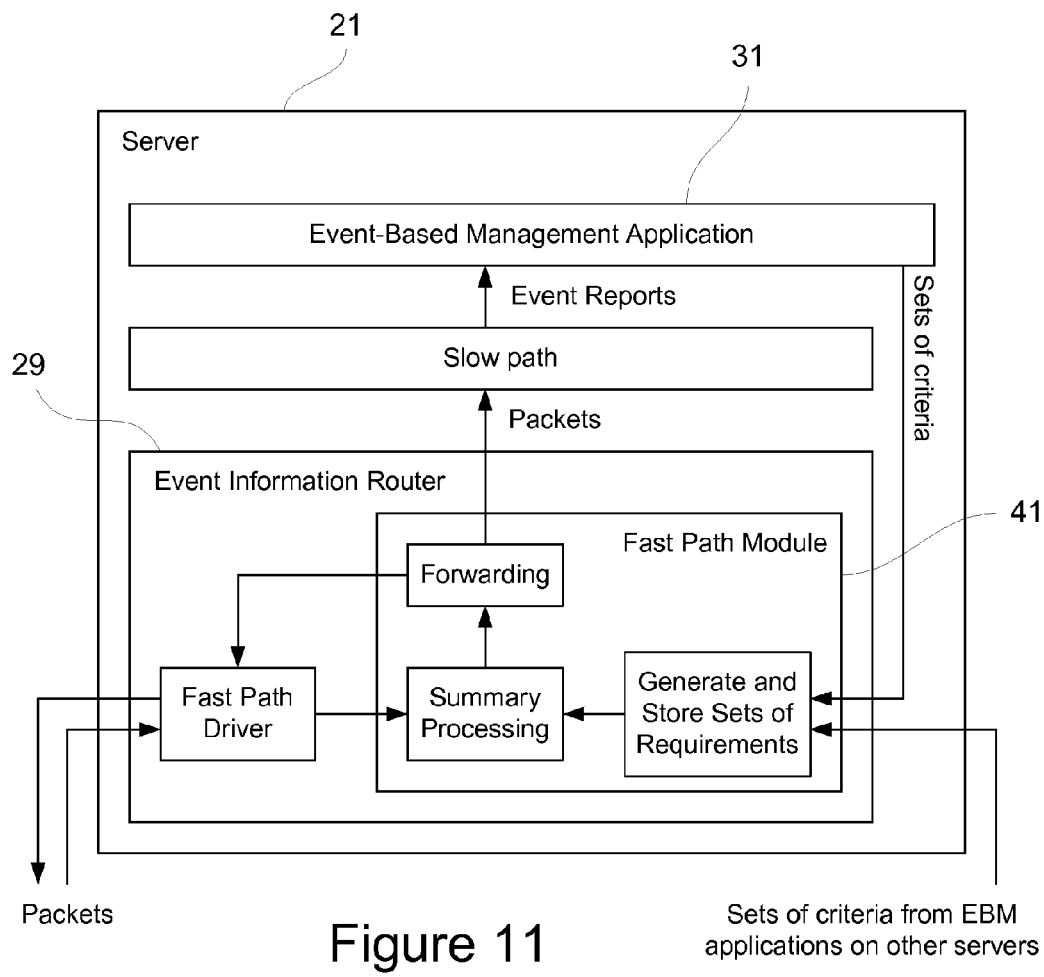
FIG. 11 illustrates the processes involved in using a summary to route event information in an embodiment of the invention using a fast path module in an operations and maintenance server.

In FIG. 11 the fast path module 41 receives a set of criteria 35 from an event-based management application 31 running on the same operations and maintenance server 21 as the event information router 29 is located. In practice, there may be more than one EBM application 31 running on the O&M server 21, in which case each EBM management application 31 provides its respective set 35 of criteria to the fast path module 41. Since the network will normally also include other O&M servers 21 on which other EBM applications 31 are running, the event information router 29 may need to be able to forward received data packets to EBM applications 31 on those other O&M servers 21, in addition to identifying the data packets that are relevant to the EBM application or applications 31 running on its local O&M server 21. Therefore the fast path module 41 also receives sets 35 of criteria from EBM applications 31 running on other servers. The sets of requirements 39 are generated and stored in the fast path module 41 in the same way as in FIG. 10, and received data packets are processed in the same way. The summaries extracted from the data packets are processed in the same way as in FIG. 10 but the fast path module 41 handles the results of this processing slightly differently. In the forwarding operation, if it is identified that the data packet is required by an EBM application running on another server, this is communicated to the fast path driver in the same way as in FIG. 10 and the data packet is copied towards the EBM application 31 as appropriate. However, if it is identified that the data packet is relevant for an EBM application 31 running on the same server, the data packet is sent to the server's normal slow processing path, for example in order to pass through in the operating system network stack. The data packet is processed to remove the event report or block of event reports in its payload, and this is decoded according to the encoding rules originally used to convert the block or event report into binary for transmission, and in this way the event report or event reports are recovered from the data packet. The event report or event reports are then forwarded to the event-based management application 31 for processing. This procedure requires use of the slow processing path in the O&M server 21 because of the complex and variable nature of the operations required to extract and decode the event reports from the data packets. These operations require the flexibility of the processor slow path and are not suitable for fast path processing.

However, as mentioned above it may be possible to design some event-based management applications 31 to operate directly on the summaries 33 rather than the full event reports 23, and this can reduce the amount of processing required in the O&M server 21. This possibility is illustrated in FIG. 12.

Figure 12:
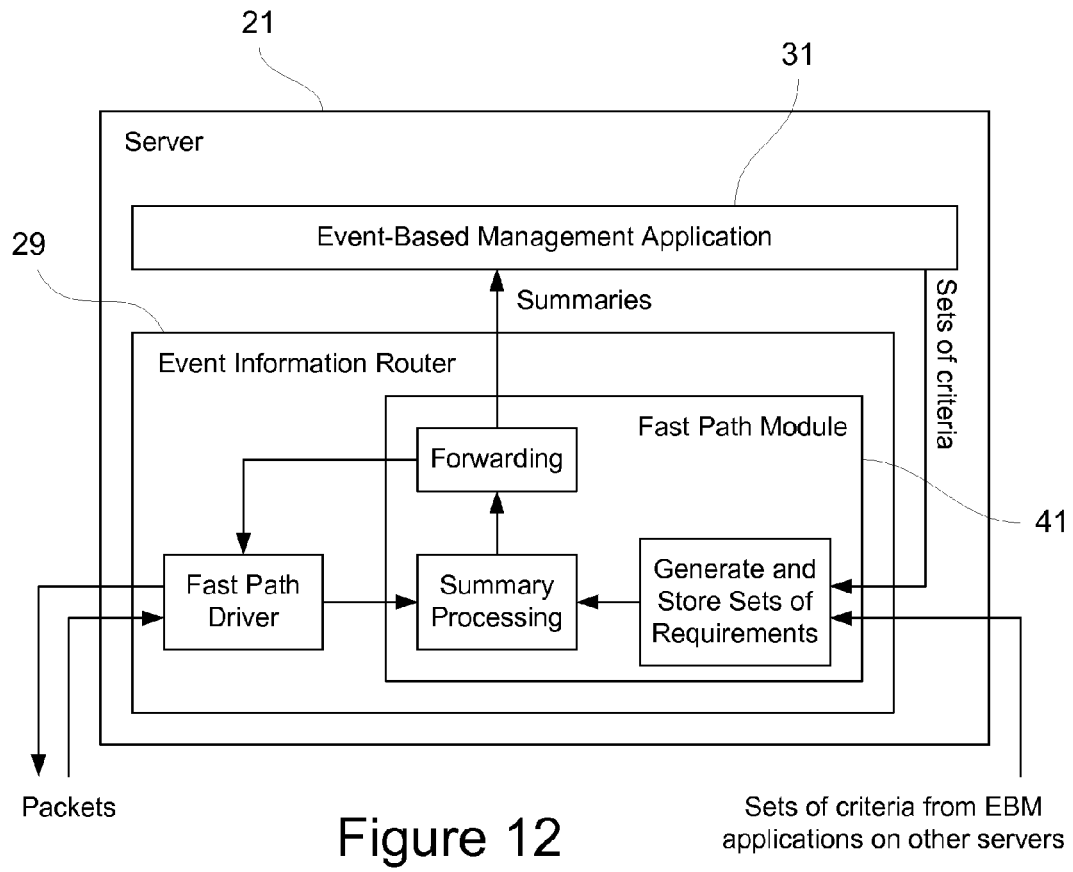
FIG. 12 illustrates the processes involved in using a summary to route event information in an embodiment of the invention using a fast path module in an operations and maintenance server having a management application that uses summaries.

The event information router 29 in FIG. 12 operates in the same way as the event information router 29 of FIG. 11 except that, if it identifies that a data packet is relevant to a local event-based management application 31, and that EBM application uses the summaries 33 rather than the full event reports 23, the fast path module 41 operates to send the summary 33 to the EBM application 31 rather than sending the data packet towards it via the processing slow path of the server 21. Because the EBM application 31 in this case does not require the full event report 23, there is no need for the event report 23 to be extracted from the data packet and decoded, and therefore the main slow path processing operations of FIG. 11 can be avoided.

The event-based management application 31 may itself run on the main processor of the operations and maintenance server 21 using the operating system, so that it consumes processor time and resources. Nevertheless, processor time and resources are saved by avoiding the need to extract and decode the event report 23, thereby reducing the processing load on the server.

As an alternative, since the event-based management application 31 only requires the summary 33 for its processing operations, those operations may be sufficiently simple and standardised that a fast processing path can be designed for the EBM application 31 itself. This is particularly the case if the main function of the EBM application 31 is to maintain a key performance indicator, and its main response to receiving an appropriate summary 33 is to increment a counter, such as a count of the number of relevant events, as measured by the number of relevant summaries 33 received by the EBM application 31, that occur within a specified time interval.

In this case, the EBM application 31 can be arranged to operate in a manner very similar to the event information router 29. It may have a criterion 37 for each counter that it maintains, and a corresponding set of requirements 39 stored in a ternary content-addressable memory (TCAM). When the EBM application 31 receives a summary 33 from the event information router 29, it interrogates the summary by using the summary to address its own TCAM, and increments a counter or counters selected in accordance with the identification of which sets of requirements 39 are met by the summary 33 according to the TCAM output.

Figure 13:
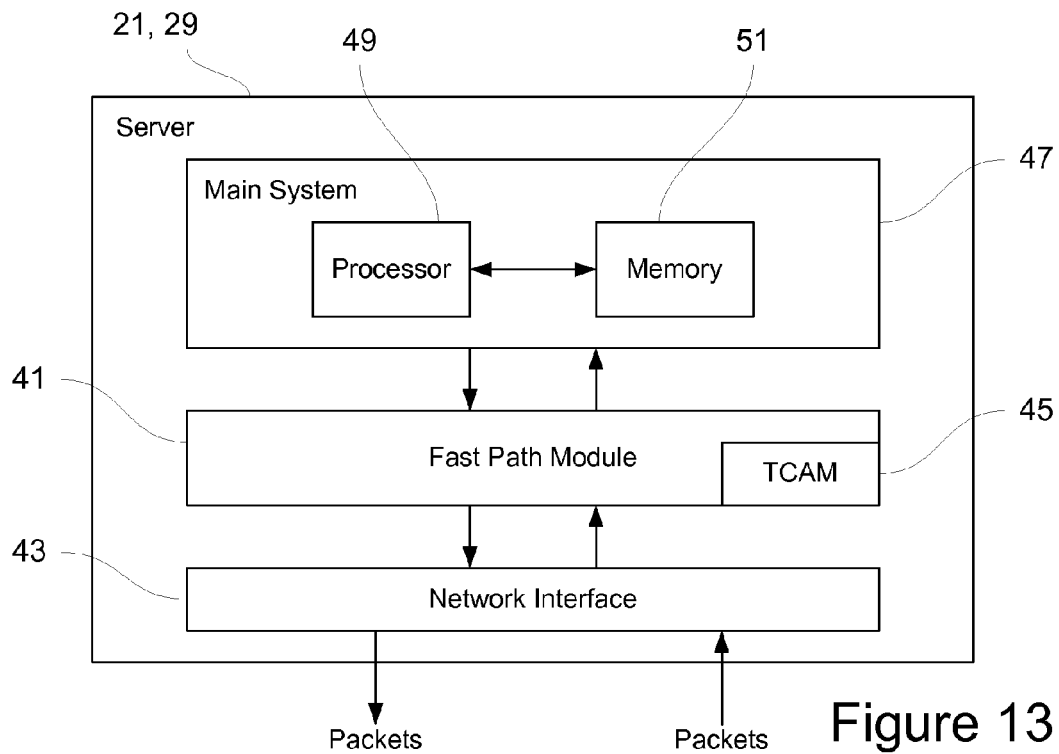
FIG. 13 illustrates some of the components at a node having a fast path routeing module, in an embodiment of the invention.
Figure 14:
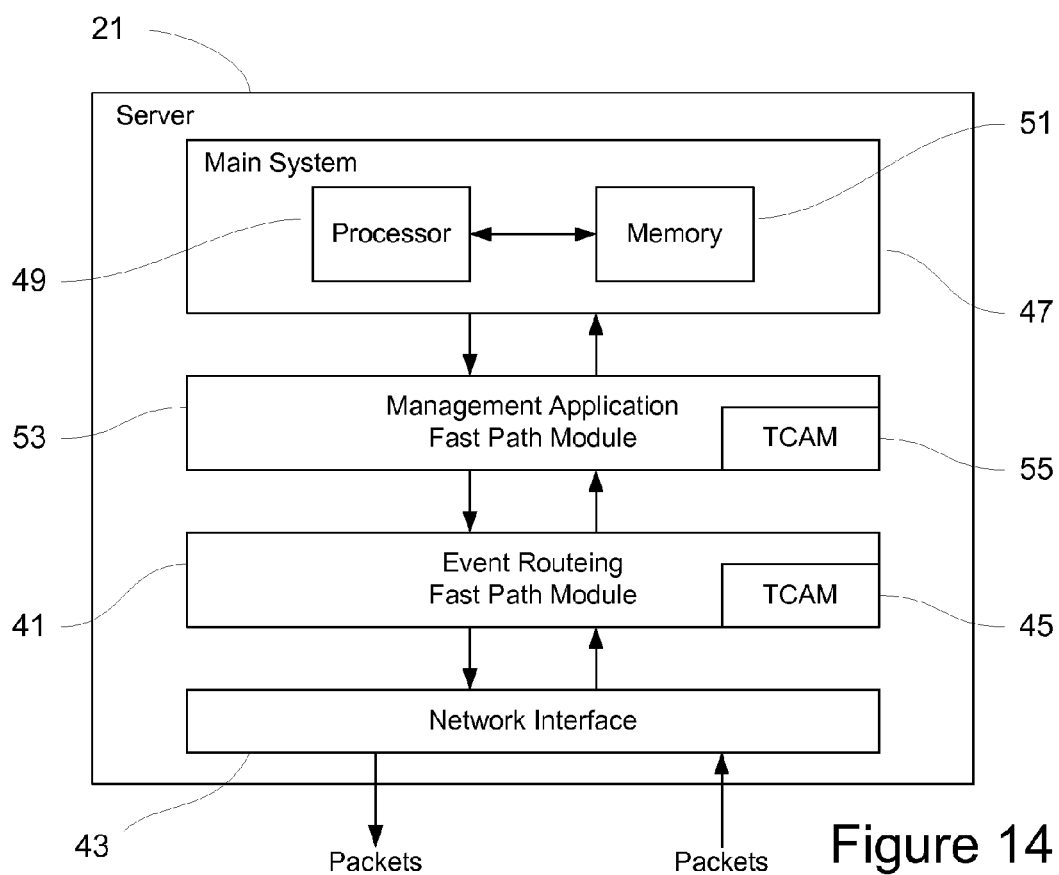
FIG. 14 illustrates some of the components at a node having a fast path routeing module and fast path event-based management module in an embodiment of the invention.

The main hardware components for implementing the operational systems shown in FIGS. 10 to 12 are illustrated in FIGS. 13 and 14.

FIG. 13 shows the main components of a server which may form part of a network node that acts as an event information router 29 separate from the operations and maintenance servers 21, or which may act as one of the operations and maintenance servers 21. The server has a network interface 43 for receiving and transmitting data packets over the network, as will be familiar to those skilled in the art. The network interface 43 communicates with the fast path module 41 that takes routeing decisions for event information. The fast path module 41 includes a TCAM 45 as previously discussed. The network interface 43 provides summaries 33 or data packets as required to the fast path module 41, and the fast path module 41 identifies to the network interface 43 where data packets including the summaries 33 should be routed to. The server also includes a main system 47, that comprises the normal server components such as a processor 49 and a memory 51 for carrying out the normal processing operations of the server. If this hardware is used to implement an operations and maintenance server 21 performing operations as shown in FIG. 11, the event-based management application 31 runs on the processor 49, and the fast path module 41 sends summaries 33 or data packets to the main system 47 for processing. The set 35 of criteria, for identifying the event information required by the event-based management application 31, is sent from the main system 47 of the server to the fast path module 41.

FIG. 14 shows modified hardware used to implement the operations and maintenance server 21 performing operations as shown in FIG. 12. In addition to the components shown in FIG. 13, the server 21 of FIG. 14 includes a dedicated management application fast path module 53 for implementing the event-based management application 31. As previously discussed, this fast path module 53 includes its own TCAM 55. The fast path module 41 for routeing event information will pass summaries 33 as appropriate to the fast path module 53 for the event-based management application 31. The EBM fast path module 53 will also communicate with the main system 47 of the server, for example to output counter information for the key performance indicator or indicators generated by the EBM application 31 running in the fast path module 53, and possibly also to provide alarm indications if any of the counters exceed threshold values.

In practice, the fast path module 41 for routeing event information and the EBM fast path module 53 may be combined into a single fast path module, with a single TCAM. The results of interrogating a summary 33 are then used in the combined module both to take routeing decisions and, if appropriate, to increment a counter for a key performance indicator.

Figure 15:
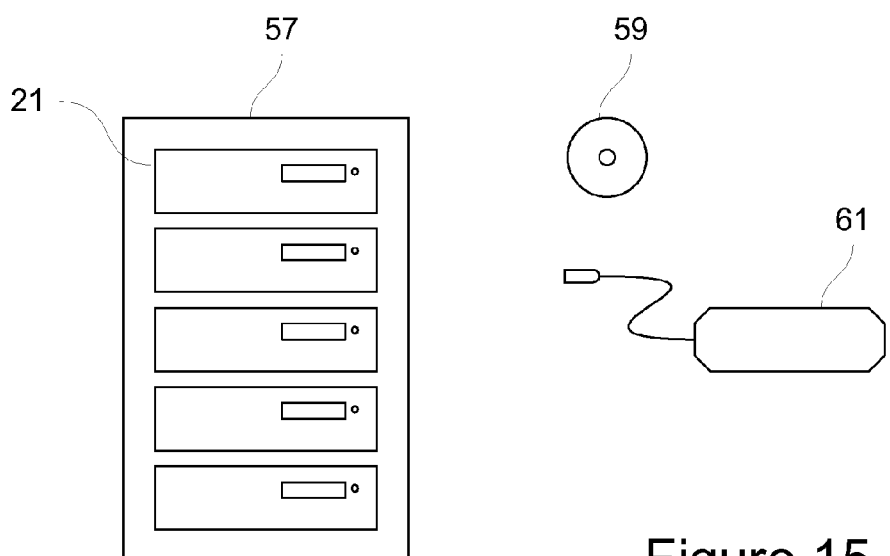
FIG. 15 illustrates a rack of servers.

The servers shown in FIGS. 13 and 14 may be fitted into server racks 57, as shown in FIG. 15. The main system 47 of the server will need to have programs installed on it and updated, and the fast path module 41 used for routeing event information and the fast path module 53 for implementing an event-based management application 31 (if present) will also need to be programmed and to receive program updates. Normally, the programs and program updates will be sent to the server over the network, but if necessary program information can be provided on a data carrier such as an optical disk 59 (DVD or CD) or on a portable external hard drive 61. Depending on the configuration of the server rack 57 and the servers fitted to it, the optical disk 59 or the external hard drive 61 may be placed in an optical disk drive or connected to an appropriate port (e.g. a USB port) on the relevant server itself, or a port or an optical disk drive on the server rack 57 may be used with selectable connections to any of the servers in the rack 57.

A discussion has already been given, with respect to FIG. 2, of an example of an event occurring at a node 27 of the network, information about the event being collected, and an event report 23 being generated. A process for generating a summary 33 from the information about the event has been discussed with reference to FIGS. 6 and 7. The data values used in the process for generating the summary 33 are the same data values as are used to create the event report 23. Accordingly, it is convenient to integrate the process of generating the summary 33 with the process of generating the event report 23. For example, after the event information has been logged, at the end of the process discussed with reference to FIG. 2, that same event information may be used both to generate the event report 23 and to generate the summary 33. It is anticipated that an application running at the node 27, for capturing event information and preparing the event report, can be modified by a plug-in routine that uses the event information to generate the summary. The application for generating the event report will include a coding routine, that encodes the event report into binary for transmission in a data packet, and the application for generating the event report will output the binary-coded event report to the application that prepares the data packet. The summary generated by the plug-in can also be encoded by the coding routine, or it can be sent directly to the application for preparing the data packet if the summary is generated in binary form and does not need encoding before being included in the data packet.

This manner of generating the summary 33 is efficient, since it uses the same event information as is used to prepare the event report, and will normally be the most convenient way of generating the event report. However, there are circumstances in which it may be difficult to modify an existing application for generating an event report, e.g. by providing a plug-in for generating the summary 33, or there may be difficulty in writing a new application for generating both the summary 33 and the event report 23 from the same event information. Under these circumstances, an alternative manner of generating the summary 33 may be used, by means of a separate program application which can be regarded as a "middle box".

In the middle box implementation, the application that generates the summary 33 does not receive the event information directly, but instead receives the event report 23. The middle box program can then analyse the contents of the event report 23 to recover the event information needed to generate the summary 33, and then generate the summary 33 according to the chosen summarising process. This implementation uses more processing power than the implementation using a plug-in to the application that initially generates the event report, because the middle box implementation requires additional processing to analyse the event report 23 and recover the event information from it. However, it enables the generation of the summary 33 to be performed independently of the collection of event information and generation of the event report 23, and therefore may be the most effective way of modifying existing network nodes 27 so that they can generate a summary 33. In this implementation, the middle box program for generating the summary 33 would run at the same node 27 as the event report 23 is generated. For example, when the event report 23 is output to the encoding application for conversion to binary, the event report could also be sent to the middle box program for analysis and generation of the summary 33.

Figure 16:
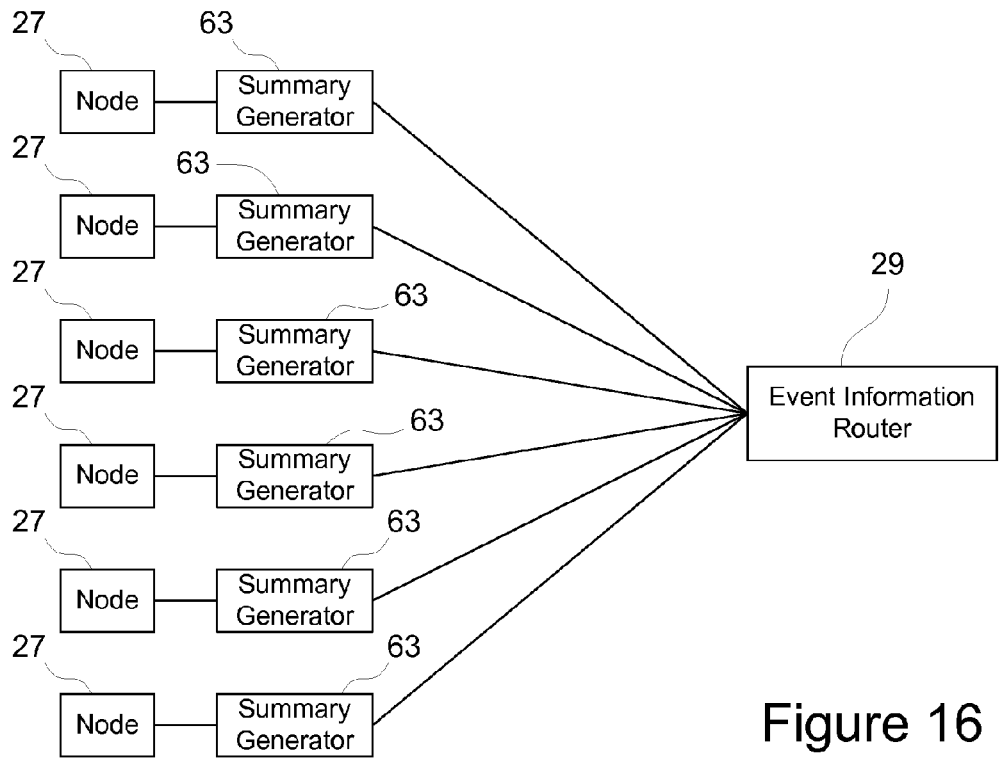
FIG. 16 shows schematically an arrangement of nodes in a part of a telecommunications network, in which summaries are generated in separate nodes from the nodes where events occur.

As a further possibility, in the case that it is not practical for some reason to modify the node 27 at which the event report is generated, the middle box program could run at a separate event-summarising node downstream (with respect to the transmission of the event report over the network) of the node 27 where the event report is generated. An example of such an arrangement is shown in FIG. 16, where each node 27 that generates an event report is connected to a node 63 that generates the summary 33. In this network architecture, a data packet including an event report 23 passes from the node 27 that creates the event report to the node 63 for generating the summary. The event report 23 is recovered from the data packet, decoded and analysed, and the summary 33 is generated. The summary 33 is then added to the data packet, which is then passed on into the network, to be received by an event information router 29 that uses the summary 33 to route the data packet or the event information in it in the manner already discussed.

The existence of the node 63 that generates the summary 33 may be entirely hidden from the node 27 that generates the event report 23, by operating the summary-generating node 63 in a "packet sniffing" manner, in a similar way to the operation of the event information router 29 in a "packet sniffing" manner as previously discussed. Therefore the node 27 that generates the event report can address the data packet containing the event report to a local event information router 29 or to a particular event-based management application 31, and the node 63 for generating the summary 33 intercepts the data packet, analyses its contents, and modifies it to add the summary 33 before sending it on its way. It will be appreciated that, although this implementation adds additional nodes to the network, it can be implemented in a pre-existing network with minimum disruption to the operation of the main nodes 27 that generate the event reports 23.

Figure 17:
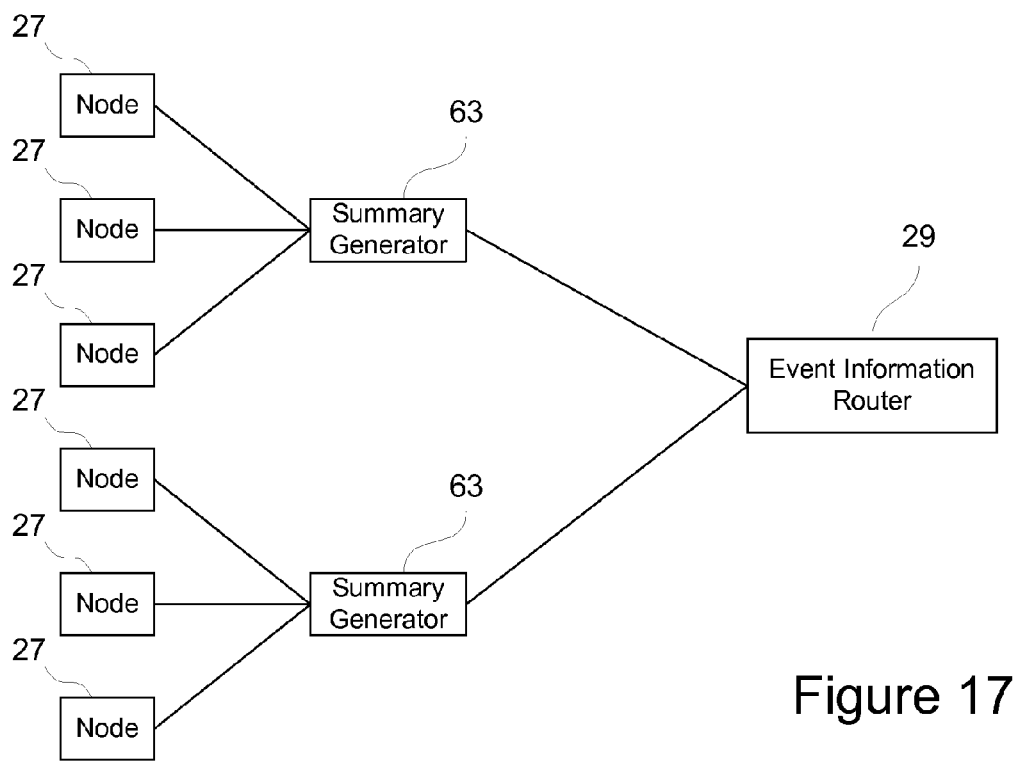
FIG. 17 shows a similar arrangement to FIG. 16, but in which multiple nodes where events occur share a common node that generates summaries.

In practice, any particular node 63 that generates summaries 33 may have more processing capability than is required for generating the summaries 33 for the event reports 23 coming from a single node 27. Consequently, it may be more efficient to arrange for event reports 23 from two or more nodes 27 to be sent to the same node 63 for generating summaries 33, as is indicated schematically in FIG. 17.

In a further middle box implementation, the program for generating the summary 33 may run in some event information routers 29. If an event report will need to pass through several event information routers 29 before reaching the event-based management application 31 at which it is processed, the first event information router 29 to receive the event report 23 will need to extract, decode and analyse the event report 23 in the slow path because there is no summary 33. However, if that event information router 29 then generates a summary 33 and adds it to the data packet before forwarding the data packet, any subsequent event information router 29 receiving that data packet will be able to use the summary 33 to make its routeing decisions.

Figure 18:
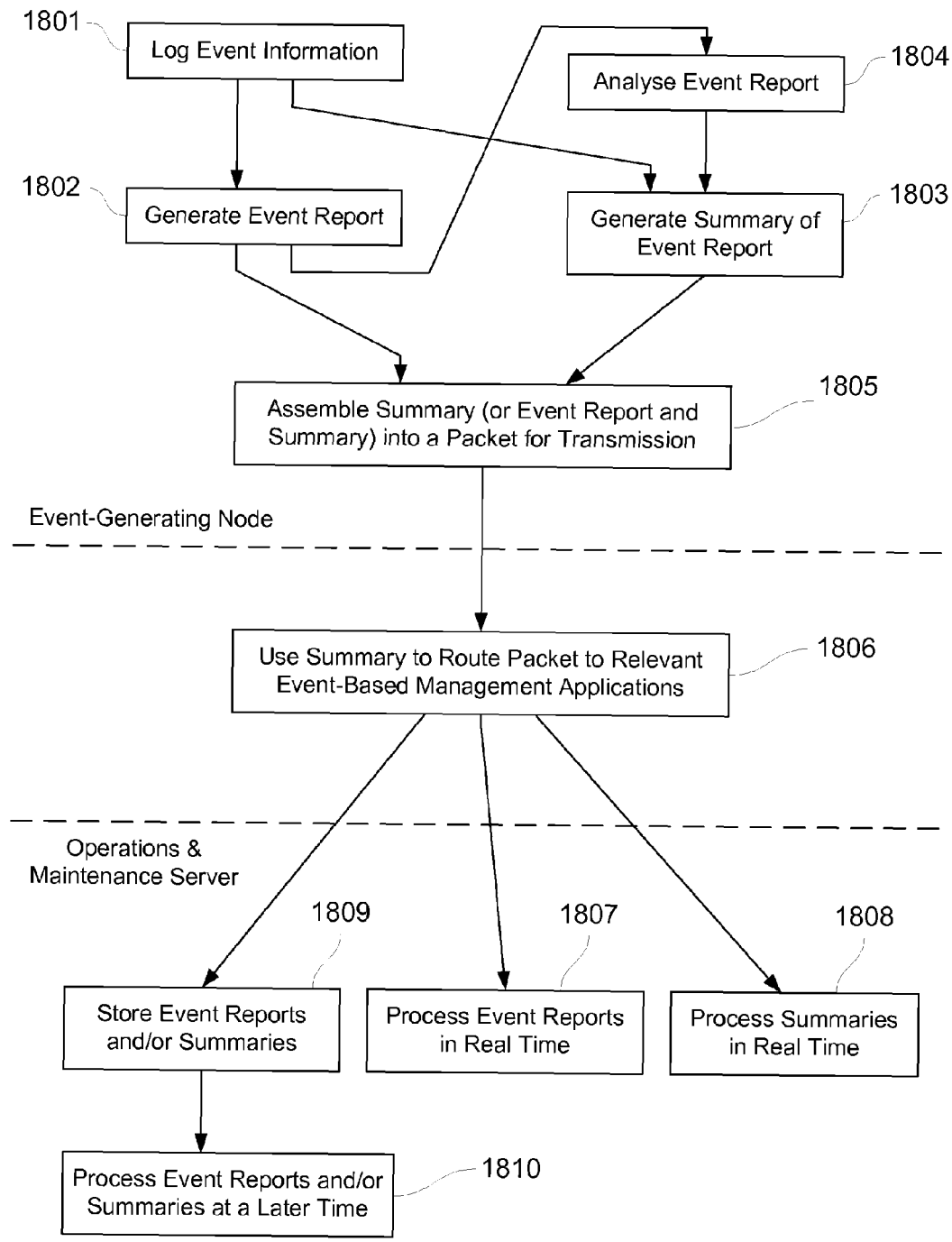
FIG. 18 shows the overall sequence of operations for processing event information in a telecommunications network according to an embodiment of the invention.

The overall sequence of events in some embodiments of the present invention is illustrated in FIG. 18. In step 1801 the event information is logged while an event is taking place at a node 27 of the network. In step 1802, the event information is used to generate an event report 23. This step does not take place in all possible embodiments, since there is the possibility that, for at least some types of event, only the summary will be needed by the event-based management applications 31 so that the generation of the event report 23 itself can be omitted. In step 1803, the event information is also used to generate the summary 33. As has already been noted, the summary 33 is generated directly from the event information in only some embodiments. In other embodiments, the event report 23 is analysed in step 1804 to recover event information from it, and it is this recovered event information that is used in step 1803 to generate the summary 33. Step 1804 can only be carried out if an event report has been generated in step 1802, and therefore if no event report 23 is required the present invention should be implemented in such a way that the summary 33 is generated in step 1803 from the event information logged in step 1801.

The summary 33 generated in step 1803, together with any event report 23 generated in step 1802 if required, is assembled into a data packet for transmission in step 1805.

Steps 1801 to 1805 will normally be carried out in the same event-generating node 27, as noted in FIG. 18. However, this is not necessary and the summary 33 can be generated in a different node from the node 27 that generates the event report, as discussed above.

In step 1806 the summary 33 is used to route the packet towards the relevant event-based management application or applications 31. This step may take place in the same operations and maintenance server 21 as the event-based management application 31, or may take place at a separate node in the network.

In the operations and maintenance server 21, the event-based management application 31 may process event reports 23 in real time to provide network management information and/or perform network management operations, in step 1807. Alternatively, it may process event summaries 33 to perform the same sorts of real-time operations in step 1808. As a further possibility, that will normally be carried out in parallel with the real time processing of the event information in step 1807 and/or step 1808, the event reports and/or summaries may be stored in step 1809, for processing at a later time in step 1810. In general, the management of a telecommunications network will normally require real-time operations as in steps 1807 and 1808, in order to enable the network to be maintained and any problems dealt with as they arise. However, it is normally also necessary to store event information for later analysis, both to enable long-term statistics to be provided and also to ensure that records are available for a retrospective review of the manner in which the network performed at a particular time.

As explained above, the use of summaries 33 allows a substantial reduction in the total processing time and processor resources consumed in the network to route event information in step 1806, as compared with routeing operations that require an event report to be decoded and analysed. Additionally, where event summaries 33 can be processed by event-based management applications 31, as in step 1808, this can replace equivalent event-based management applications 31 that processed full event reports as in step 1807, and this also reduces the processing time and processing resources consumed in the network because the event reports no longer need to be decoded and analysed. A further advantage arrives out of step 1809, to the extent that it is possible to store event summaries 33 in place of event reports 23, as the reduced size of the summary 33 compared with the event report 23 reduces the amount of data storage capacity required by the network operator for storing historic network information. This could result in a reduced storage cost for the network operator. Alternatively, it may make it practical for the network operator to store historic information for longer periods.

Normally, an event summary 33 will not make sense, and no useful information or meta-information can be recovered from it, without prior knowledge of the method used to generate it. For example, if it is generated using hash functions as discussed with reference to FIGS. 6 and 7, it will normally be impossible to recover any information from the summary 33 without prior knowledge of the hash functions used to generate it and possibly also without prior knowledge of the selection made of which attributes (items of information) relating to the event were selected for use in generating the summary 33. This feature of the summary 33 can provide useful privacy in circumstances where only the summary 33 is sent from the node 27 that logs the event information, and no event report 23 is transmitted, or in the case that summaries 33 are stored in step 1809 instead of full event reports. For example, sensitive personal information about a user such as the IMSI and MSISDN of the user equipment (mobile phone 5 or notebook computer 7) being used can be hidden by the method used to generate the summary 33. This increases the security of this data. Additionally, a network hardware supplier might provide nodes 27 to a network operator and also provide operations and maintenance servers 21 to the operator, running event-based management applications (or a supplier might supply event report generating applications and event-based management applications to the network operator). The event reports 23 generated in the nodes 27 are used by event-based management applications 31 running in the operations and maintenance servers 21. In this case, the supplier might wish to use a confidential and company-proprietary format for the event reports 23. If the event information routers 29 in the network are not supplied by the same supplier (or do not use software from the same supplier), the contents of the event reports 23 cannot be used to route the corresponding data packets unless the confidential event report format is disclosed. However, if the event information is also used to create a standard-form event summary 33, this can be used for routeing the data packets in the event information routers 29 without the need to disclose the confidential formats for the event reports 23.

Figure 19:
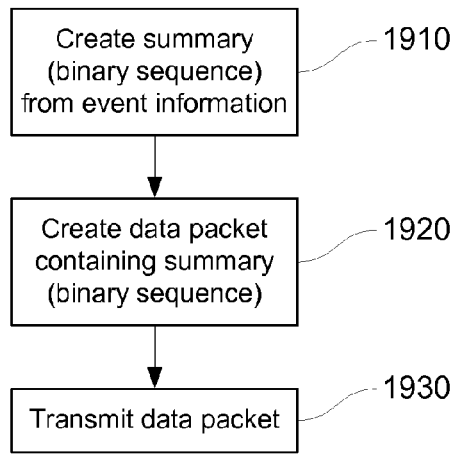
FIG. 19 is a flow diagram for a process for creating and sending a summary.

FIG. 19 shows a flow diagram for the process of creating and sending the summary 33. In step 1910 the summary 33 (e.g. a binary sequence as shown in FIG. 6 or FIG. 7) is created from event information, for example by the use of hash functions and a Bloom filter. In step 1920 a data packet is created that contains the summary. In step 1930 the data packet is transmitted. In the present embodiment, steps corresponding to steps 1910 to 1930 are carried out at a node of the telecommunications network, regardless of which manner of creating the summary is used and regardless of whether or not the data packet also includes an event report or block of event reports.

FIGS. 20 to 23 show developments of the flow diagram of FIG. 19, and corresponding steps in FIGS. 19 to 23 have the same final two digits of the step number as each other.

Figure 20:
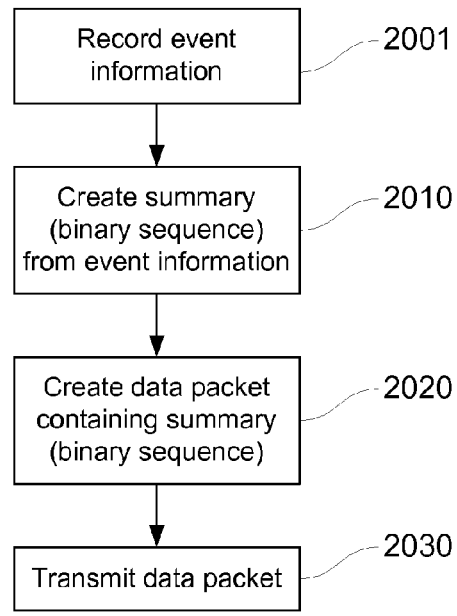
FIG. 20 is a flow diagram for a process for creating and sending a summary at the same node as an event occurs.

FIG. 20 shows a development of the flow diagram of FIG. 19, for the process of creating and transmitting the summary 33 in the case that this is done at the same node 27 as the relevant event occurs and the event information is recorded. Accordingly, in step 2001 the event information is recorded. In step 2010 (corresponding to step 1910) the summary 33 is created from event information. The event information used to create the summary 33 may be some or all of the event information recorded in step 2001, or may be derived from it (for example by analysis of an event report created using the event information recorded in step 2001). In step 2020 (corresponding to step 1920) a data packet, containing the summary 33, is created. In step 2030 (corresponding to step 1930) the data packet is transmitted.

Figure 21:
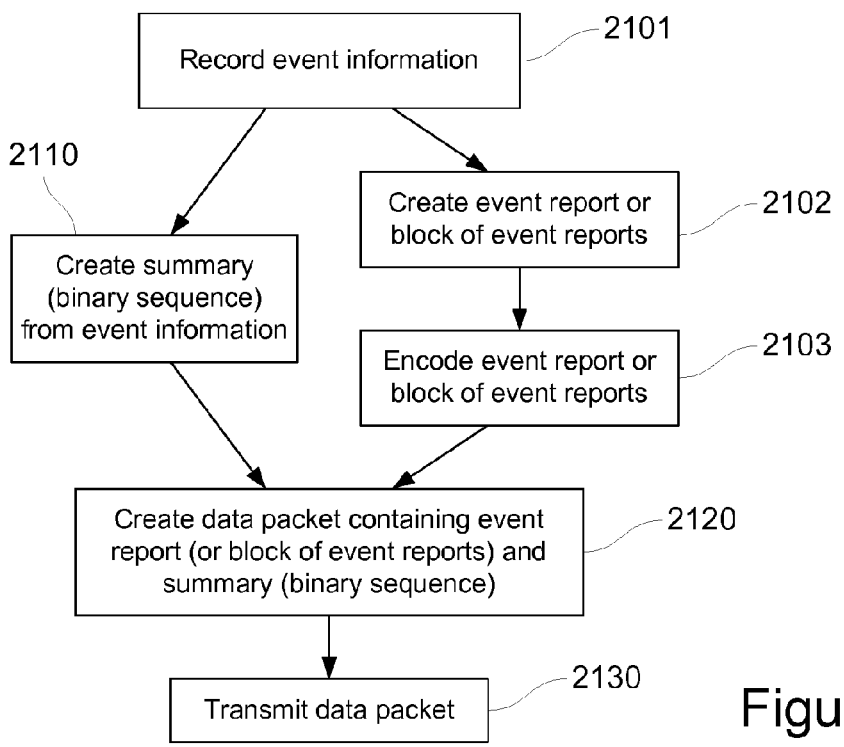
FIG. 21 is a flow diagram for a process for creating and sending a summary and an event report at the same node as an event occurs.

FIG. 21 shows a flow diagram for the process where the summary 33 is created from the event information recorded at the same node, and an event report is also created from that event information. Accordingly, an event occurs at the node 27, and in step 2101 event information about that event, is recorded. In step 2102 an event report is created from the recorded event information, or alternatively a block of event reports is created from event information recorded in respect of more than one event. In step 2103, the event report or block of event reports is encoded into a form suitable for transmission in a data packet. For example, it is converted to binary using a set of encoding rules, as previously discussed. In step 2110, the summary 33 is created from event information. As in FIG. 20, it may be created either directly from event information recorded in step 2101 or using event information recovered by analysing the event report or block of event reports created in step 2102. Both the summary 33 created in step 2110, and the encoded event report or block of event reports from step 2103, are used in step 2120 to create the data packet, and therefore the data packet contains the event report, or the block of event reports, in addition to containing the summary 33. In step 2130 the data packet is transmitted.

Figure 22:
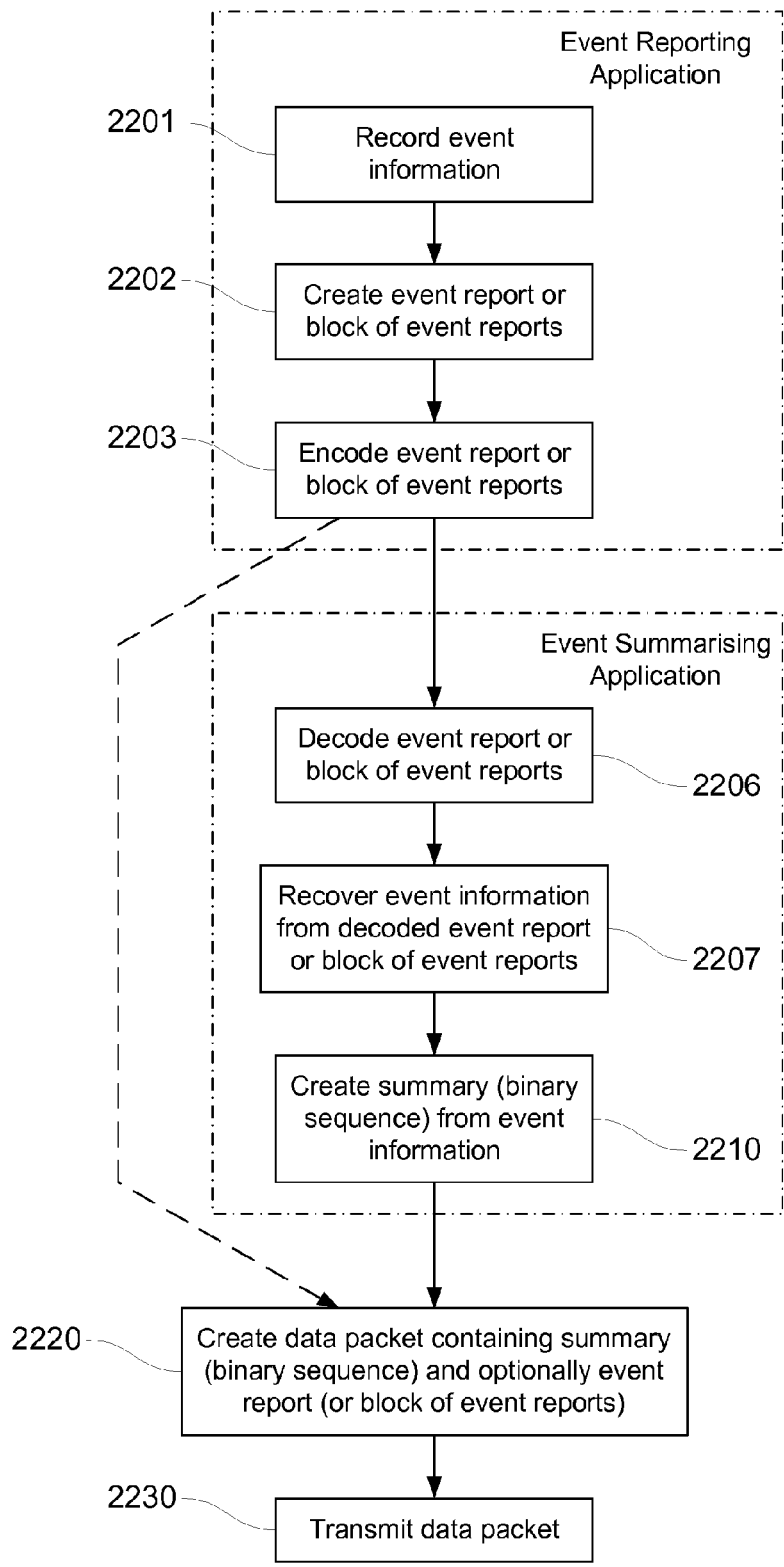
FIG. 22 is a flow diagram for a process for creating a summary from an event report and sending the summary.

FIG. 22 is a flow diagram for the process of creating and transmitting the summary 33 in the case that the summary is created in a "middle box" application running at the same node as the event occurs. In this case, event information is recorded in step 2201 and the event report 23, or block 25 of event reports, is created in step 2202 using the event information recorded in step 2201. The event report 23 or block 25 of event reports is encoded for transmission in a data packet in step 2203, in the same way as in step 2103 of FIG. 21. In step 2206, the encoded event report or block of event reports from step 2203 is decoded, and in step 2207 event information is recovered from the decoded event report or block of event reports. The event information recovered in step 2207 is used in step 2210 to create the summary 33. In step 2220 a data packet is created containing the summary that was created in step 2210. Optionally, the encoded event report or block of event reports from step 2203 is also included in the data packet created in step 2220. Finally, the data packet is transmitted in step 2230. Typically, steps 2201, 2202 and 2203 are performed by an event reporting application running at the node 27 where the event takes place, and steps 2206, 2207 and 2210 are performed by a separate event summarising application running at the same node. As discussed above, this can be an effective way of creating the summary if it is difficult to modify a prior art event reporting application so as to create the summary.

Figure 23:
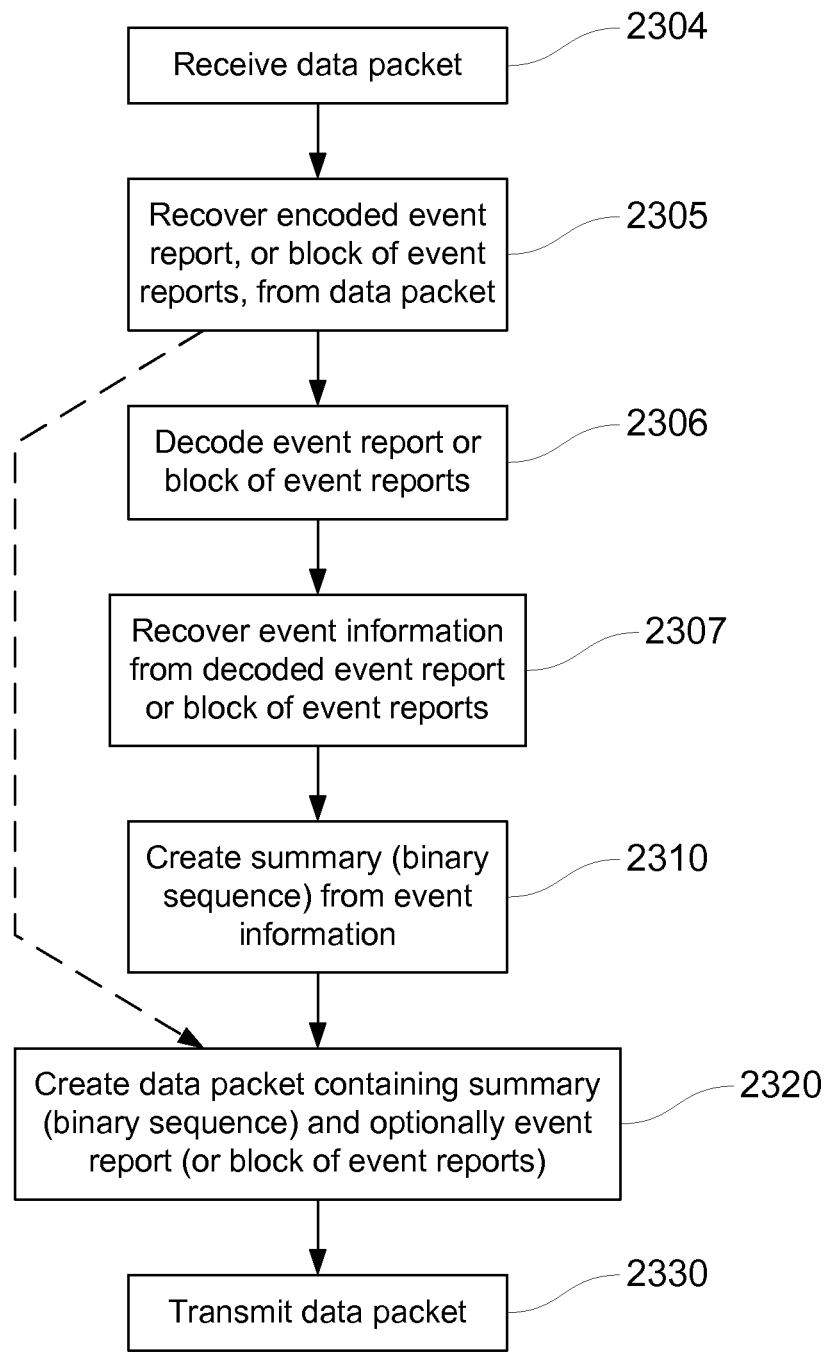
FIG. 23 is a flow diagram for a process for creating and sending a summary at a different node from the node where the event occurs.

FIG. 23 is a flow diagram for a method of creating a summary 33 in a separate node 63 from the node 27 at which the event occurs. In step 2304, the node 63 receives a data packet containing an encoded event report or block of event reports. In step 2305 the encoded event report or block of event reports is recovered from the data packet. This may include normal steps for recovering an item from the payload of a data packet. Then in step 2306 the encoded event report or block of event reports is decoded, in the same way as in step 2206 of FIG. 22, and in step 2307 event information is recovered from the decoded event report or block of event reports in the same way as step 2207 of FIG. 22. In step 2310 the summary 33 is created using event information recovered from the event report or block of event reports in step 2307. In step 2320 a data packet is created containing the summary 33 that was created in step 2310. Optionally, the data packet created in step 2320 may include the event report or block of event reports recovered in step 2305, and step 2320 may comprise modifying the data packet received in step 2304 to add the summary 33 to it, either in the payload or in the packet header. However, it is also possible that the data packet created in step 2320 does not include the event report or block of event reports recovered in step 2305, for example if the event-based management applications 31 that will eventually receive the data packet can perform their operations using the summary 33 and do not need to receive event reports 23. Finally, in step 2330 the data packet created in step 2320 is transmitted.

Figure 24:
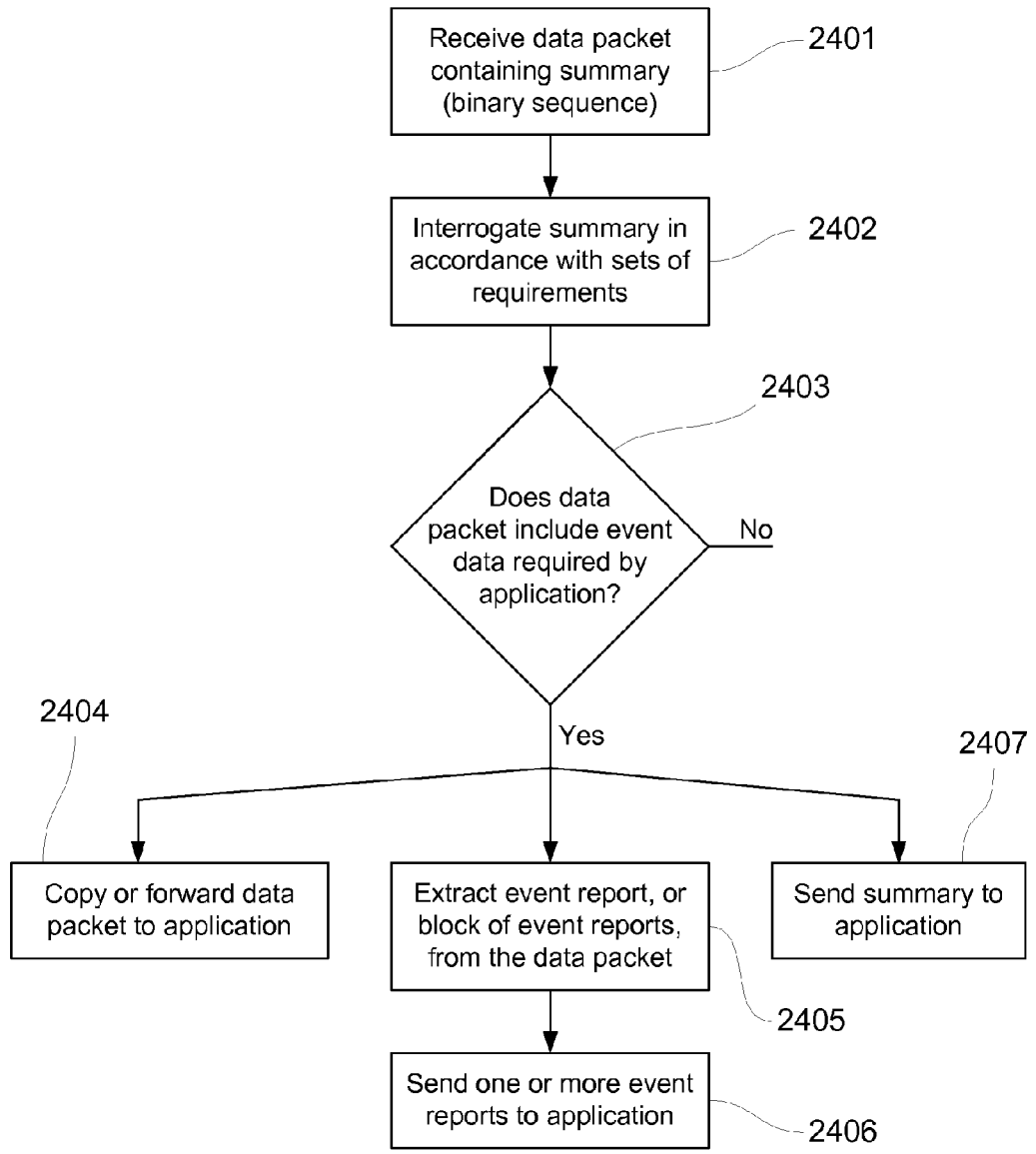
FIG. 24 is a flow diagram for a process for routeing event information using a summary.

FIG. 24 is a flow diagram for the method of routeing event information using a summary, either at a separate routeing node 29 or in an operations and maintenance server 21 where an event-based management application is running. In step 2401 the node receives a data packet that contains a summary 33, for example a binary sequence as discussed with reference to FIGS. 6 and 7. In step 2402 the summary 33 from the data packet is interrogated in accordance with the sets of requirements 39 derived from the sets 35 of criteria relating to event-based management applications 31 that need to use event information. In step 2403, the results of the interrogation are used to determine whether the data packet includes event data required by any event-based management application 31. If it is determined in step 2403 that the data packet does include event data required by at least one event-based management application 31, the method follows the "Yes" output from step 2403 and, in respect of each such EBM 31 the method includes one of three options.

First, the data packet may be copied or forwarded to (or towards) the EBM application 31 in step 2404. Normally, this will be the only practical option if the EBM application 31 is running at a different node from the node where the method of FIG. 24 is being carried out.

Second, the data packet may be processed in step 2405 to extract the event report 23, or block 25 of event reports, from it. The extracted event report, or at least one of the event reports from the extracted block, is sent to the event-based management application 31 in step 2406. It is not necessary in step 2406 to send all of the event reports 23 from a block 25 of event reports that has been extracted from the data packet. For example, if a summary 33 for a block of event reports has been created using a method as described with reference to FIG. 7 and the summary 33 is interrogated using a set of search requirements 39 created by a method as discussed with reference to FIG. 9, the summary 33 and the set of requirements 39 are created using hash functions that operate on data triplets, and each data triplet includes an event ID. Accordingly, the result of interrogating the summary 33 with a set of requirements 39 can include an identification of which event report in the block 25 of event reports contains event data (in the form of data values for items of event information) that are required by the event-based management application 31. Therefore it is possible in step 2406 to send only the relevant event report or event reports from the block 25, and not to send any event reports that are not required.

As discussed above, step 2406 will normally include sending the event report or block of event reports to the operating system network stack of the main processor 49 in the node, to enable the block or event report to be decoded from the binary format of the data packet. This option will normally be used in the case where the method of FIG. 24 is being performed in the same server as the event-based management application 31 is running, (or possibly a different server at the same physical location if there is some connection between nearby servers to enable data to be passed from server to server other than in data packets).

The third option is to send the summary 33 from the data packet to the event-based management application, in step 2407. This option will normally be used in similar circumstances to the second option that uses steps 2405 and 2406. The third option, using step 2407, can be followed in the case where the event-based management application 31 can use the summary 33 alone and does not require the full event report 23. In this case, the event data required by the application can be obtained from the summary 33.

After step 2404, 2406 or 2407, the method of FIG. 24 has completed. Also, the method has completed if the determination in step 2403 leads to the "No" branch. The method then restarts at step 2401 when another data packet, containing a summary 33, is received.

Figure 25:
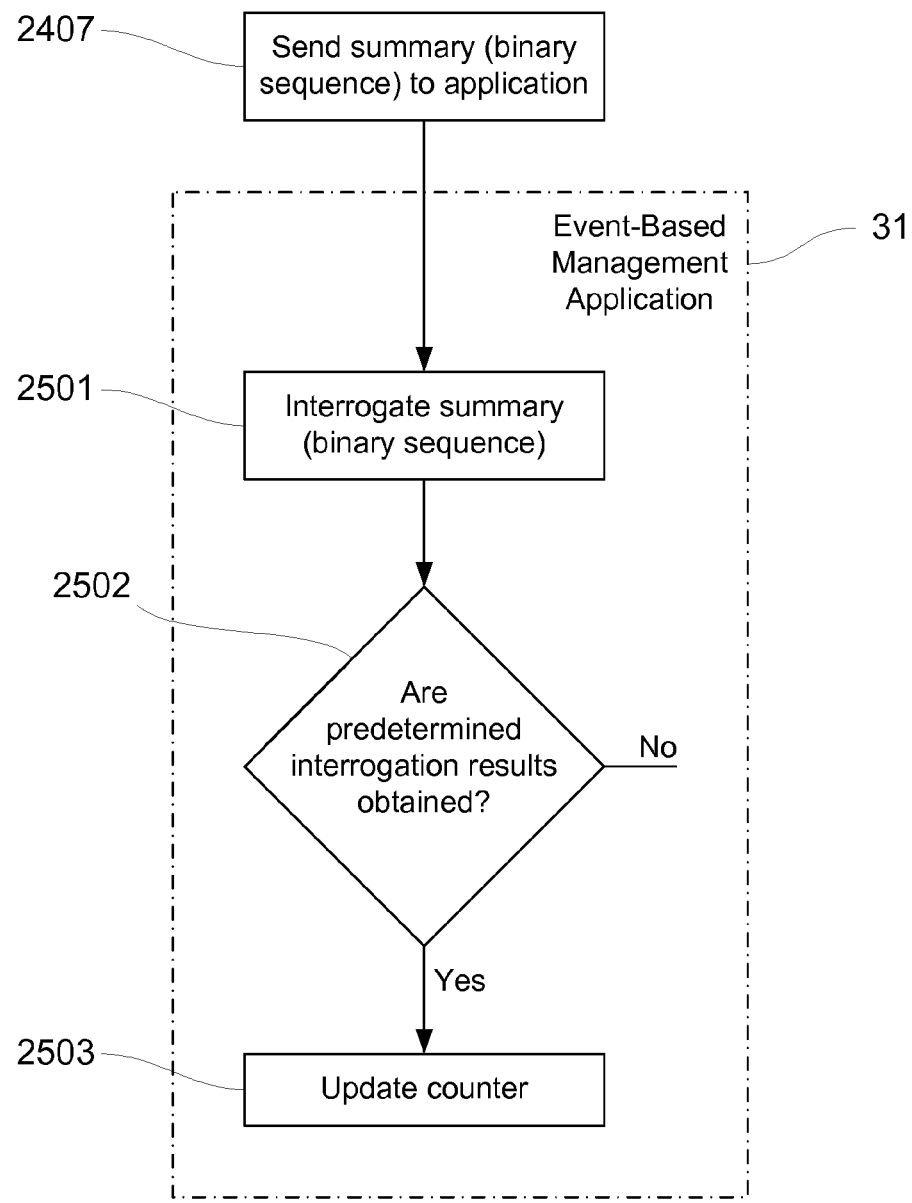
FIG. 25 is a flow diagram for a process of using a summary in an event-based management application.

FIG. 25 illustrates a method of processing a summary 33 in an event-based management application 31. In step 2407 (which is step 2407 of FIG. 24) a summary 33 is sent to the application 31. The event-based management application 31 responds by interrogating the summary 33 to determine whether one or more predetermined interrogation results are obtained. This can be done in substantially the same way as the summary 33 is interrogated in step 2402. However, the event-based management application 31 does not necessarily use the same criteria as were used in the routeing method of FIG. 24, and therefore does not necessarily use the same sets of requirements 39. For example, the event-based management application 31 may maintain several counters, which count occurrences of the same type of event at different locations within the network. The set 35 of criteria relating to this event-based management application 31, that are published to the processes performing routeing of event data within the network, need only be sufficient to identify events of the particular type that is of interest to this event-based management application 31. However, once the EBM application 31 receives a summary 33, it will need to interrogate it with additional criteria in order to determine which location in the network the event occurred at and thereby determine which counter to update. Consequently the set of requirements 39 used by the event-based management application 31 will be different in this case from the set of requirements 39 used in the routeing method of FIG. 24.

In step 2502 the results of the interrogation in step 2501 are used to determine whether the predetermined interrogation results were obtained. If the event-based management application 31 maintains multiple counters, as discussed above, it may have multiple sets of predetermined interrogation results, one for each counter. Accordingly, it may be determined in step 2502 that all of the predetermined interrogation results are obtained in respect of one counter but none of the predetermined interrogation results, or some but not all of them, are obtained in respect of another counter. If there is at least one counter in respect of which all of the required interrogation results are obtained, then in step 2503 the corresponding counter is updated. If there are no counters for which all of the required interrogation results are obtained, the management application 31 does not update any counter. This could arise, for example, if the application 31 maintained counters for a specific type of event in multiple parts of the network but not for all parts of the network, but the set 35 of criteria published to the event routing processes only identifies the relevant type of event, so that the event-based management application 31 receives summaries 33 relating to events that took place in parts of the network for which it does not maintain a counter.

The use made of the counter updated in step 2503 is not part of the method of FIG. 25, since it is not directly the result of processing the summary 33. However, as previously discussed, such a counter may be used to provide a key performance indicator for the network.

Various embodiments and examples of the present invention have been discussed above and are illustrated in the accompanying drawings. However, these are provided by way of non-limiting example and it will be apparent to those skilled in the art that alternative embodiments are possible.

The invention claimed is:

1. A node for use in a telecommunications network, the node comprising:
    a network interface circuit; and
    a processing circuit operatively connected to the network interface circuit, and configured to:
        receive, via the network interface circuit, a data packet including event data wherein:
            the event data comprises a summary that includes meta-information;
            the meta-information comprises information about a data value of at least one item of information associated with one or more events that have occurred at another node in the telecommunications network; and
            a data size of the summary is smaller than a total data size of all data values associated with the meta-information; and
        respond to receiving the data packet, wherein to respond to receiving the data packet, the processing circuit is further configured to:
            interrogate the summary to obtain the meta-information, wherein the interrogation is at least in part, using a binary sequence to address a content-addressable memory in which respective predetermined values are stored;
            determine whether one or more predetermined interrogation results are obtained from interrogating the summary; and
            update a counter if each of the one or more predetermined interrogation results are obtained from interrogating the summary.

2. The node according to claim 1 wherein the summary comprises the binary sequence that is configured to be interrogated, without decoding, to obtain the meta-information, and wherein to interrogate the summary, the processing circuit is configured to:
    interrogate the binary sequence to determine whether, for each of one or more predetermined locations in the binary sequence, a value at a given location matches a predetermined value for the given location; and
    wherein each of the one or more predetermined interrogation results are obtained if each of the one or more predetermined locations has a respective predetermined value.

3. A method of processing event data at a node in a telecommunications network, the method comprising:
    receiving, at the node in the telecommunications network, a summary comprising meta-information wherein:
        the meta-information comprises information about a data value of at least one item of information associated with one or more events that have occurred at another node in the telecommunications network; and
        a data size of the summary is smaller than a total data size of all data values associated with the meta-information;
    interrogating the summary to obtain the meta-information, wherein interrogating the summary comprises interrogating the summary, at least in part, using a binary sequence to address a content-addressable memory in which respective predetermined values are stored;
    determining whether one or more predetermined interrogation results are obtained from interrogating the summary; and
    updating a counter if each of the one or more predetermined interrogation results are obtained from interrogating the summary.

4. The method according to claim 3 wherein the summary comprises the binary sequence configured to be interrogated, without decoding, to obtain the meta-information, and wherein interrogating the summary comprises:
    interrogating the binary sequence to determine whether, for each of one or more predetermined locations in the binary sequence, a value at a location matches a predetermined value for that location; and
    wherein each of the one or more predetermined interrogation results are obtained if each of the one or more predetermined locations has a respective predetermined value.

5. The method of claim 3, wherein the determining comprises determining whether a set of one or more predetermined interrogation results of a plurality of predetermined interrogation results are obtained and the updating comprises updating a counter of a plurality of counters, wherein each counter is associated with a particular set of one or more predetermined interrogation results of the plurality of predetermined interrogation results.

6. The method of claim 3, wherein the updating a counter counts occurrences of the same type of event at the another node in the telecommunications network.

7. A method of processing event information in a node of a telecommunications network, wherein the event information comprises a set of data values for respective items of information associated with one or more events that have occurred in the telecommunications network, the method comprising:
    performing one or more predetermined operations on event information to produce a summary that can be interrogated to obtain meta-information, wherein the meta-information comprises information about a data value of at least one item of information in the event information, and wherein a data size of the summary is smaller than a total data size of all data values associated with the meta-information;

creating a data packet that includes the summary; and transmitting the data packet over the telecommunications network;

wherein the performing comprises:

forming a respective data group comprising a data value and an ID identifying the respective item of information; and performing at least one predetermined hash function on the data group, wherein performing at least one predetermined hash function on the data group comprises performing a plurality of hash functions on the data group and forming a Bloom filter using the results of the plurality of hash functions.

8. The method according to claim 7 wherein the summary comprises a binary sequence in unencoded form configured to be interrogated, without decoding, to obtain the meta-information.

9. The method according to claim 7 wherein the event information comprises a set of data values for respective items of information about one or more events that have occurred at the node, and wherein the method further comprises:

recording information about an event as it occurs and prior to performing the one or more predetermined operations on the event information to produce the summary that can be interrogated to obtain meta-information.

10. The method according to claim 9 further comprising:

forming at least one event report, each event report comprising the set of data values for at least one respective event that has occurred at the node; and encoding at least one of the event report and a block comprising a plurality of event reports for transmission in the data packet.

11. The method according to claim 10 further comprising:

decoding the at least one of the event report and the block comprising a plurality of event reports;

obtaining the event information from the decoded at least one of the event report and the block comprising a plurality of event reports; and wherein forming the at least one event report, encoding the at least one of the event report and the block comprising a plurality of event reports, and decoding the at least one of the encoded event report and the block of event reports is performed prior to performing the one or more predetermined operations on the event information to produce the summary that can be interrogated to obtain meta-information.

12. The method according to claim 7 wherein the event information comprises a set of data values for respective items of information about one or more events that have occurred at a different node in the telecommunications network, the method further comprising:

receiving a data packet at the node, wherein the data packet includes an encoded event report, or a block comprising a plurality of encoded event reports;

recovering the encoded event report or block of encoded event reports from the data packet;

decoding the event report or block of encoded event reports, wherein the event report or each of the plurality of encoded event reports comprises at least the set of data values for a respective event that occurred at the different node;

obtaining the event information from the decoded event report or block of decoded event reports; and wherein receiving a data packet at the node, recovering the encoded event report or block of encoded event reports from the data packet, and decoding the event report or block of encoded event reports is performed prior to performing the one or more predetermined operations on the event information to produce the summary that can be interrogated to obtain meta-information.

13. A node for use in a telecommunications network, the node comprising:

a network interface circuit; and a processing circuit configured to:

receive a data packet including event data, wherein:

the event data comprises a summary that includes meta-information;

the meta-information comprises information about a data value of at least one item of information associated with one or more events that have occurred at another node in the telecommunications network; and a data size of the summary is smaller than a total data size of all data values associated with the meta-information; and respond to receiving the data packet, wherein to respond to receiving the data packet, the processing circuit is further configured to:

interrogate the summary in accordance with each of one or more sets of requirements relating to an application executing in the network, wherein each set of requirements defines meta-information, obtainable from the summary, and corresponds to one or more criteria for selecting events on the basis of the data value of one or more items of information about the event;

determine, based on a result of interrogating the summary, whether the data packet includes event data that is required by the application; and if the data packet includes event data that is required by the application, perform at least one of:

copying or forwarding the data packet to the application;

sending the summary to the application; and extracting an event report or block of event reports included in the data packet, wherein the event report or each of the event reports in the block of event reports comprises a set of data values for respective items of information about an event that has occurred at the other node in the telecommunications network, and sending at least one event report to the application;

wherein the summary comprises a Bloom filter formed using the results of a plurality of hash functions on a data group comprising the data value of the at least one item of information associated with the one or more events.

* * * * *